United States Patent
Niu et al.

(10) Patent No.: US 12,213,110 B2
(45) Date of Patent: Jan. 28, 2025

(54) CONTROL RESOURCE SET/SYSTEM INFORMATION BLOCK 1 TRANSMISSION WITH MIXED NUMEROLOGY

(71) Applicant: Apple Inc., Cupertino, CA (US)

(72) Inventors: Huaning Niu, San Jose, CA (US); Chunhai Yao, Beijing (CN); Dawei Zhang, Saratoga, CA (US); Haitong Sun, Cupertino, CA (US); Hong He, San Jose, CA (US); Oghenekome Oteri, San Diego, CA (US); Seyed Ali Akbar Fakoorian, San Diego, CA (US); Sigen Ye, Whitehouse Station, NJ (US); Wei Zeng, Saratoga, CA (US); Weidong Yang, San Diego, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 660 days.

(21) Appl. No.: 17/440,138

(22) PCT Filed: Jan. 14, 2021

(86) PCT No.: PCT/CN2021/071777
§ 371 (c)(1),
(2) Date: Sep. 16, 2021

(87) PCT Pub. No.: WO2022/151161
PCT Pub. Date: Jul. 21, 2022

(65) Prior Publication Data
US 2023/0146004 A1 May 11, 2023

(51) Int. Cl.
*H04W 72/0446* (2023.01)
*H04W 72/23* (2023.01)
*H04W 74/0816* (2024.01)

(52) U.S. Cl.
CPC ....... *H04W 72/0446* (2013.01); *H04W 72/23* (2023.01); *H04W 74/0816* (2013.01)

(58) Field of Classification Search
CPC . H04W 74/08; H04W 74/00; H04W 72/0446; H04W 76/27; H04W 72/1289; H04W 72/1268; H04B 1/713
See application file for complete search history.

(56) References Cited

U.S. PATENT DOCUMENTS

| | | |
|---|---|---|
| 2019/0289661 A1 | 9/2019 | Chen |
| 2019/0364408 A1* | 11/2019 | Park .................. H04W 72/1273 |

(Continued)

FOREIGN PATENT DOCUMENTS

| | | |
|---|---|---|
| WO | 2019192319 | 10/2019 |
| WO | 2020033660 | 2/2020 |
| WO | 2020198671 | 10/2020 |

OTHER PUBLICATIONS

The International Application No. PCT/CN2021/071777, "International Preliminary Report on Patentability," mailed Jul. 27, 2023, 6 pages.

(Continued)

*Primary Examiner* — Iqbal Zaidi
(74) *Attorney, Agent, or Firm* — Kilpatrick Townsend & Stockton LLP

(57) ABSTRACT

The present application relates to devices and components including apparatus, systems, and methods to provide repetition of system information block type 1 in a plurality of slots.

16 Claims, 14 Drawing Sheets

(56) References Cited

U.S. PATENT DOCUMENTS

2020/0053670 A1    2/2020  Jung et al.
2020/0336891 A1*  10/2020  Guo ......................... H04W 8/20
2020/0383105 A1*  12/2020  Park ...................... H04L 1/1896

OTHER PUBLICATIONS

Multiple-Gigabit/s radio equipment operating in the 60 GHz band; Harmonised Standard for access to radio spectrum, Draft ETSI EN 302 567 V2.2.0, Dec. 2020, 42 pages.
In the Matter of Revision of Part 15 of the Commission's Rules Regarding Operation in the 57-64 GHz Band, Federal Communications Commission, FCC 13-112, Aug. 9, 2013, 32 pages.
3rd Generation Partnership Project; Technical Specification Group Radio Access Network; NR; Physical layer procedures for control (Release 16), 3GPP TS 38.213 V16.4.0, Dec. 2020, 181 pages.
International Patent Application No. PCT/CN2021/071777, International Search Report and Written Opinion, Mailed on Oct. 15, 2021, 9 pages.

* cited by examiner

| Index | O | Number of search space sets per slot | M | First symbol index |
|---|---|---|---|---|
| 0 | 0 | 1 | 1 | 0 |
| 1 | 0 | 2 | 1/2 | {0, if i is even}, {7, if i is odd} |
| 2 | 2.5 | 1 | 1 | 0 |
| 3 | 2.5 | 2 | 1/2 | {0, if i is even}, {7, if i is odd} |
| 4 | 5 | 1 | 1 | 0 |
| 5 | 5 | 2 | 1/2 | {0, if i is even}, {7, if i is odd} |
| 6 | 0 | 2 | 1/2 | {0, if i is even}, {$N_{symb}^{CORESET}$, if i is odd} |
| 7 | 2.5 | 2 | 1/2 | {0, if i is even}, {$N_{symb}^{CORESET}$, if i is odd} |
| 8 | 5 | 2 | 1/2 | {0, if i is even}, {$N_{symb}^{CORESET}$, if i is odd} |
| 9 | 7.5 | 1 | 1 | 0 |
| 10 | 7.5 | 2 | 1/2 | {0, if i is even}, {$N_{symb}^{CORESET}$, if i is odd} |
| 11 | 7.5 | 1 | 1 | 0 |
| 12 | 0 | 1 | 2 | 0 |
| 13 | 5 | 1 | 2 | 0 |
| 14 | | | Reserved | |
| 15 | | | Reserved | |

Figure 5

| Index | O | Number of search space sets per slots | M | First symbol index |
|---|---|---|---|---|
| 0 | 0 | 1 | 1 | 0 |
| 1 | 0 | 1 | 2 | 0 |
| 2 | 0 | 1 | 4 | 0 |
| 3 | 0 | 1 | 8 | 0 |
| 4 | 2.5 | 1 | 1 | 0 |
| 5 | 2.5 | 1 | 2 | 0 |
| 6 | 2.5 | 1 | 4 | 0 |
| 7 | 2.5 | 1 | 8 | 0 |
| 8 | 5 | 1 | 1 | 0 |
| 9 | 5 | 1 | 2 | 0 |
| 10 | 5 | 1 | 4 | 0 |
| 11 | 5 | 1 | 8 | 0 |
| 12 | 7.5 | 1 | 1 | 0 |
| 13 | 7.5 | 1 | 2 | 0 |
| 14 | 7.5 | 1 | 4 | 0 |
| 15 | 7.5 | 1 | 8 | 0 |

Figure 6

```
SEQUENCE {
    BIT STRING (SIZE (6)),
    ENUMERATED (scs15or60, scs30or120),
    INTEGER (0..18),
    ENUMERATED (pos2, pos3),
    PDCCH-ConfigSIB1,
    ENUMERATED (barred, notBarred),
    ENUMERATED (allowed, notAllowed),
    BIT STRING (SIZE (1))
}
```

```
MIB ::=
    systemFrameNumber          ← 904
    subCarrierSpacingCommon
    ssb-SubcarrierOffset
    dmrs-TypeA-Position
    pdcch-ConfigSIB1           ← 902
    cellBarred
    intraFreqReselection
    spare
```

CONTROL RESOURCE SET/SYSTEM INFORMATION BLOCK 1 TRANSMISSION WITH MIXED NUMEROLOGY

CROSS-REFERENCES TO RELATED APPLICATIONS

This application is a U.S. National Stage Application of PCT/CN2021/071777, filed Jan. 14, 2021. The disclosure of which is herein incorporated by reference in its entirety for all purposes.

BACKGROUND

In Third Generation Partnership Project (3GPP) networks, transmissions between NodeBs and user equipments may have set layouts of elements in the time and frequency domains to facilitate processing of the elements. In some instances, patterns have developed, such synchronization signal/physical broadcast channel (SSB) and control resource set (CORESET) multiplexing patterns, that define relationships between the elements in the time and frequency domains for a transmission.

BRIEF DESCRIPTION OF THE DRAWINGS

FIG. 5 illustrates example parameters for physical downlink control channel monitoring occasions for Type0-PDCCH common search space (CSS)-synchronization signal/physical broadcast channel block and control resource set multiplexing pattern 1 and frequency range 2 in accordance with some embodiments.

FIG. 6 illustrates example parameters for frequency range 3 in accordance with some embodiments.

FIG. 9 illustrates an example master information block information element in accordance with some embodiments.

DETAILED DESCRIPTION

Figure 1:
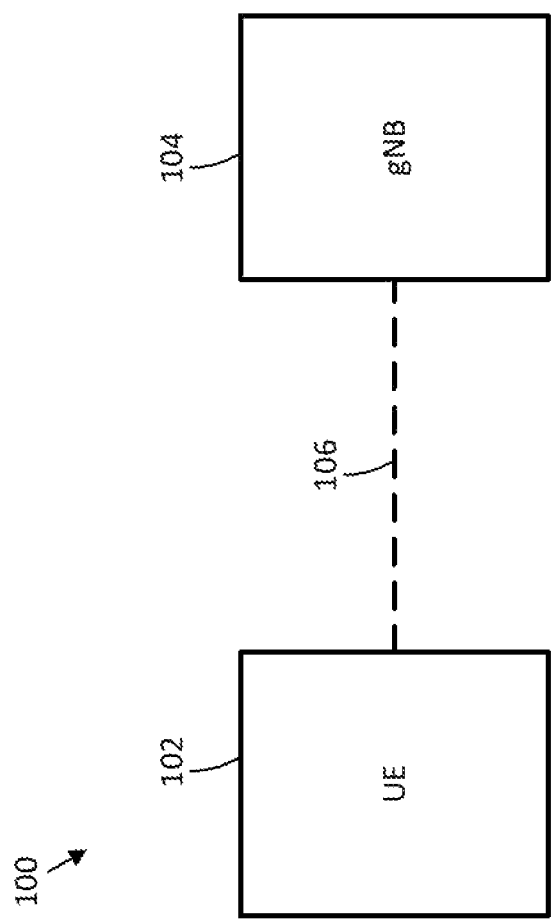
FIG. 1 illustrates an example network arrangement in accordance with some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

The following is a glossary of terms that may be used in this disclosure.

The term "circuitry" as used herein refers to, is part of, or includes hardware components such as an electronic circuit, a logic circuit, a processor (shared, dedicated, or group) or memory (shared, dedicated, or group), an application specific integrated circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable system-on-a-chip (SoC)), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, or transferring digital data. The term "processor circuitry" may refer an application processor, baseband processor, a central processing unit (CPU), a graphics processing unit, a single-core processor, a dual-core processor, a triple-core processor, a quad-core processor, or any other device capable of executing or otherwise operating computer-executable instructions, such as program code, software modules, or functional processes.

The term "interface circuitry" as used herein refers to, is part of, or includes circuitry that enables the exchange of information between two or more components or devices. The term "interface circuitry" may refer to one or more hardware interfaces, for example, buses, F/O interfaces, peripheral component interfaces, network interface cards, or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "computer system" as used herein refers to any type interconnected electronic devices, computer devices, or components thereof. Additionally, the term "computer system" or "system" may refer to various components of a computer that are communicatively coupled with one another. Furthermore, the term "computer system" or "system" may refer to multiple computer devices or multiple computing systems that are communicatively coupled with one another and configured to share computing or networking resources.

The term "resource" as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, or the like. A "hardware resource" may refer to compute, storage, or network resources provided by physical hardware element(s). A "virtualized resource" may refer to compute, storage, or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with or equivalent to "communications channel," "data communications channel," "transmission channel," "data transmission channel," "access channel" "data access channel," "link," "data link," "carrier," "radio-frequency carrier," or any other like term denoting a pathway or medium through which data is communicated. Additionally, the term "link" as used herein refers to a connection between two devices for the purpose of transmitting and receiving information.

The terms "instantiate," "instantiation," and the like as used herein refers to the creation of an instance. An "instance" also refers to a concrete occurrence of an object, which may occur, for example, during execution of program code.

The term "connected" may mean that two or more elements, at a common communication protocol layer, have an established signaling relationship with one another over a communication channel, link, interface, or reference point.

The term "network element" as used herein refers to physical or virtualized equipment or infrastructure used to provide wired or wireless communication network services. The term "network element" may be considered synonymous to or referred to as a networked computer, networking hardware, network equipment, network node, virtualized network function, or the like.

The term "information element" refers to a structural element containing one or more fields. The term "field" refers to individual contents of an information element, or a data element that contains content. An information element may include one or more additional information elements.

As fifth generation (5G) wireless networks have developed, changes and/or updates to synchronization signal/ physical broadcast channel (SSB) patterns have been considered. Some considerations for the changes and/or updates to the SSB patterns include unlicensed band operation if listen before talk (LBT) is required for SSB, for example SSB cycling transmission within a discovery reference signal (DRS) transmission window. Further considerations include beam switching time between SSB, coverage of SSB, and multiplexing of SSB with control resource set (CORESET) and uplink (UL) transmissions.

120 kilohertz (kHz) subcarrier spacing may be supported with normal cyclic prefix (CP) length, and at least one more subcarrier spacing. At most up to three subcarrier spacings may be supported, including 120 kHz subcarrier spacing. Numerologies 480 kHz, and 960 kHz are considered as additional numerologies in addition to 120 kHz, and numerologies outside this range may not be supported for any signals or channels.

In terms of SSB link budget, smaller subcarrier spacing (SCS) have better coverage than larger SCS. The maximum coupling loss (MCL) and maximum isotropic loss (MIL) difference between 120 kHz SCS and 480 kHz SCS is about 5 decibels (dB). The MCL and MIL difference between 120 kHz SCS and 960 kHz SCS is about 8 dB.

Figure 15:
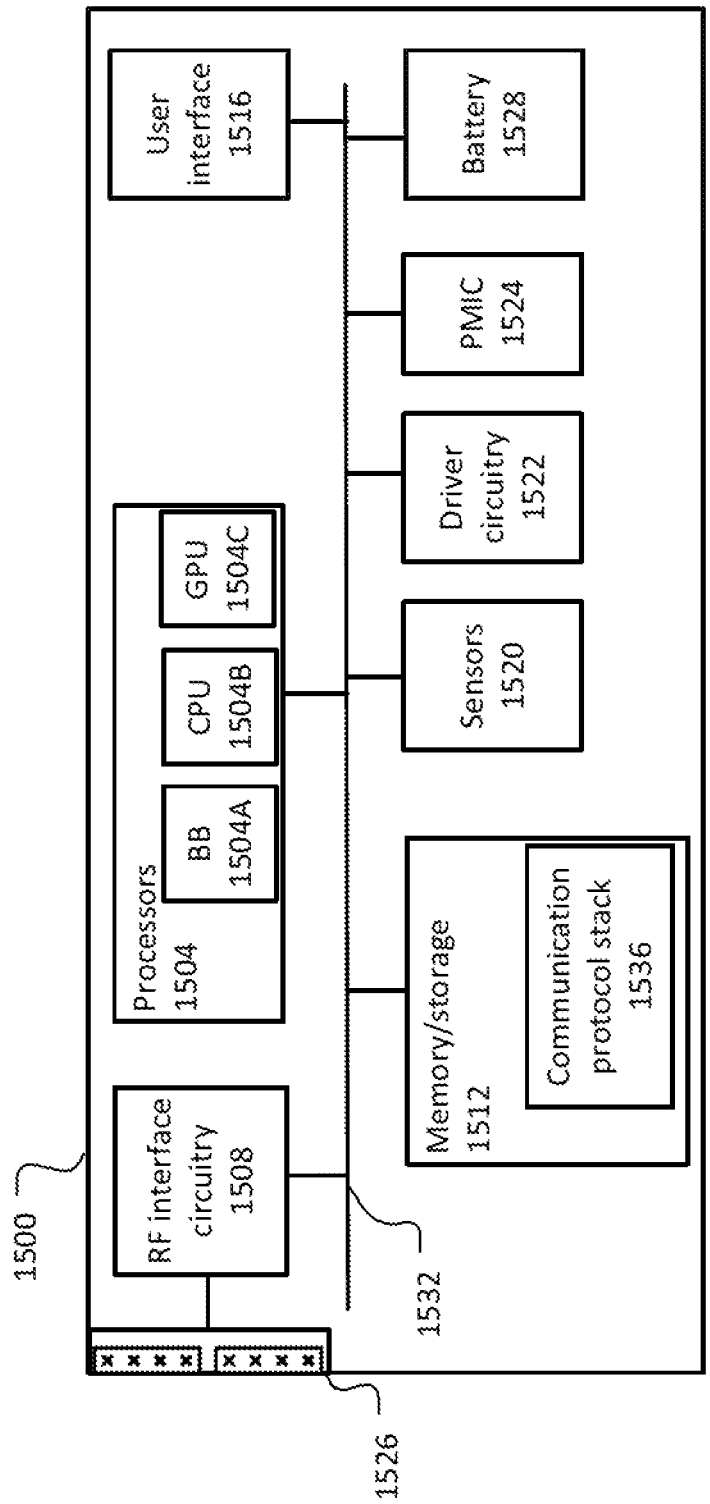
FIG. 15 illustrates an example user equipment in accordance with some embodiments.
Figure 16:
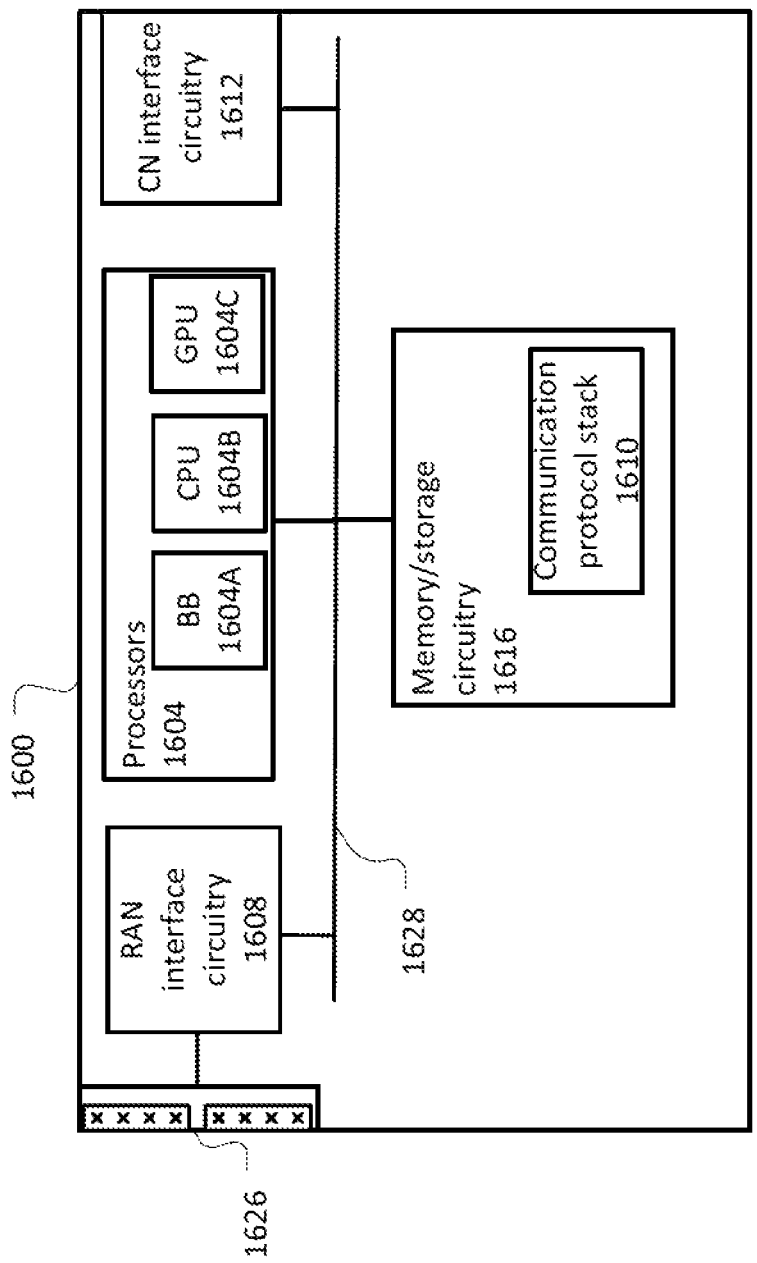
FIG. 16 illustrates an example next generation NodeB in accordance with some embodiments.

FIG. 1 illustrates an example network arrangement 100 in accordance with some embodiments. The network arrangement 100 may include a user equipment (UE) 102 and next generation NodeB (gNB) 104. The UE 102 may include one or more of the features of the UE 1500 (FIG. 15). The gNB 104 may include one or more of the features of the gNB 1600 (FIG. 16).

A wireless connection 106 may be established between the UE 102 and the gNB 104. For example, the UE 102 may establish the connection 106 with the gNB 104. The connection 106 may be utilized for exchanging communications between the UE 102 and the gNB 104. In particular, the connection 106 may be utilized transmissions described throughout the disclosure. Further, the UE 102 and the gNB 104 may perform the corresponding operations described throughout the disclosure, including the operations related to repeated system information block type 1 (SIB1) transmissions.

Regulations have been defined for 5G wireless networks. For example, European Standards (ENs) and the Federal Communications Commission (FCC) have defined some regulations for 5G wireless networks. In particular, the regulations may include some regulations defined by the ENs and the FCC for 5G wireless networks with operations occurring in the 57 to 71 gigahertz (GHz) range. Of particular interest are the power spectral density (PSD) (effective isotropic radiated power (EIRP)) and radio frequency (RF) output power limitations. These limitations may limit an amount of data that can be transmitted between a NodeB (such as a gNB) and a UE to maintain the PSD and the RF output power below the defined levels. The EN has defined the PSD to be 23 decibel-milliwatts (dBm) per megahertz (MHz) (dBnvMHz) in most cases. Further, the EN has provided for the PSD to be 38 dBmNMHz for fixed outdoor installations with greater than 30 decibels relative to an isotropic antenna (dBi) transmit antenna gain.

The EN has defined the RF output power to be GA<13 dBi, max eirp-27 dBm+GA; 13 dBi<=GA<30 dBi, max eirp=40 dBm; 30 dBi<−GA (Not fixed outdoor), max eirp=40 dBm; or 30 dBi, where adaptivity (Medium Access Protocol) has automatic transmit power control (ATPC) being mandatory. In some instances, the EN has defined the RF output power to be 40 dBm, where adaptivity (Medium Access Protocol) has LBT being mandatory. The FCC has defined the RF output power to have maximun average of 40 dBm average and a maximum peak of 43 dBm for indoor. Further, the FCC has defined the RF output power to have maximum average of 82-2N dBm and a Max peak of 85-2N dBm, where N=max(0.51 dBi-GA) for outdoor point to point.

In instances where the LBT is mandatory, the EN has defined the occupied channel bandwidth as being at least 70% of the declared nominal channel bandwidth. In instances where the ATPC is mandatory, the EN has defined the occupied channel bandwidth as <100%: It was agreed during BRAN #105 to replace "between 70% and 100%" with "less than 100%". However, there was no discussion related to the possible value of a lower limit (the 70%) with respect to the use of "nominal channel bandwidth in clause 4.2.7.2.] for the EN occupied channel bandwidth. In some instances, the EN has defined the maximum channel occupancy time (MCOT) to be 5 milliseconds (msecs), such as in the instances when LBT is mandatory. Further, the EN has defined the clear channel assessment (CCA) threshold to be −47 dBm+10×log 10(PMax/Pout) in some instances, such as in the instances when LBT is mandatory.

Some SSB and CORESET multiplexing patterns have been defined. In new radio (NR), 120 kHz and 240 kHz SSB is specified. For example, some SSB and CORESET multiplexing patterns have been defined for 120 kHz and 240 kHz SSB SCS. The SSB and CORESET multiplexing patterns may have a total maximum of 64 SSB per SSB burst. 120 kHz SCS may be defined with starting position of each SSB being (4,8,16,20)+28n, where n=0, 1, 2, 3, 5, 6, 7, 8, 10, 11, 12, 13, 15, 16, 17, 18, 240 kHz SCS may be defined with starting position of each SSB being {8, 12, 16, 20, 32, 36, 40, 44}+56n, n=0, 1, 2, 3, 5, 6, 7, 8. A master information block (MIB) may configure the SIB1 search space with 8 bits. The 4 most significant bits (MSB) may define a CORESET for different SSB SCS, physical downlink control channel (PDCCH) SCS, and min bandwidth (BW). The 4 least significant bits (LSB) may determine PDCCH monitoring indicating PDCCH allocation (for example, the number of resource blocks (#RBs), the number of symbols (#symbols), and resource block (RB) offset). The 4 LSB may indicate PDCCH monitoring occasion for different pattern and SCS combination.

Figure 2:
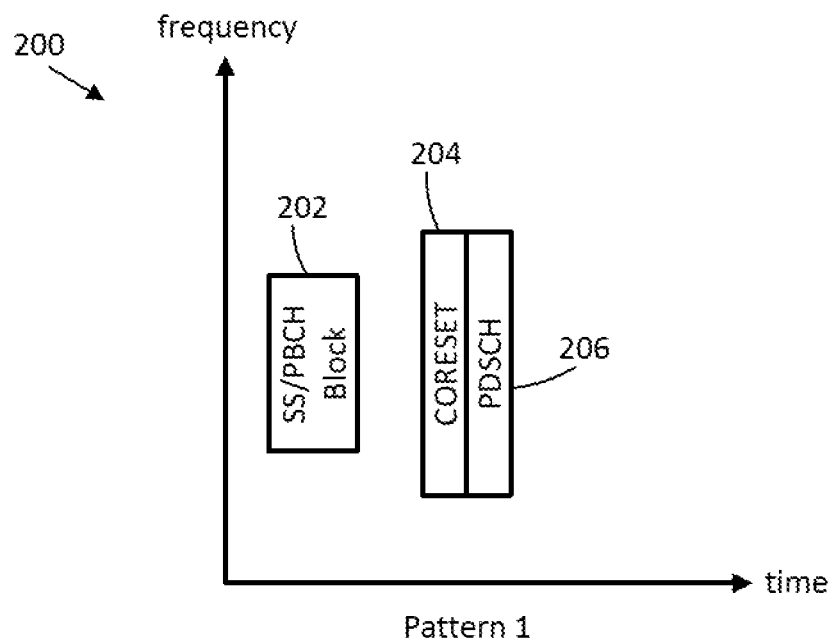
FIG. 2 illustrates an example multiplexing pattern 1 transmission arrangement for 120 kilohertz and 240 kilohertz synchronization signal/physical broadcast channel block in accordance with some embodiments.

FIG. 2 illustrates an example multiplexing pattern 1 transmission arrangement 200 for 120 kHz and 240 kHz SSB in accordance with some embodiments. In particular, FIG. 2 illustrates elements to be transmitted within the multiplexing pattern 1 transmission arrangement 200 on a frequency versus time graph. The multiplexing pattern 1 transmission arrangement 200 may define timing and frequency for elements transmitted within an SSB and CORESET multiplexing pattern.

The multiplexing pattern 1 transmission arrangement 200 may include an SSB transmission 202, a CORESET transmission 204, and a physical downlink shared channel (PDSCH) transmission 206. Each of the SSB transmission 202, the CORESET transmission 204, and the PDSCH transmission 206 may comprise one or more symbols to be transmitted. As can be seen, the SSB transmission 202 may be transmitted before the CORESET transmission 204 and the PDSCH transmission 206 in time. There may be a gap in time between the SSB transmission 202 and the CORESET transmission 204, where the gap may comprise one or more symbols. The CORESET transmission 204 may be between the SSB transmission 202 and the PDSCH transmission 206 in time. For example, the CORESET transmission 204 may be transmitted right before the PDSCH transmission 206 in time, such that the CORESET transmission 204 ends as the PDSCH transmission 206 begins. The SSB transmission 202, the CORESET transmission 204, and the PDSCH transmission 206 may overlap in frequency. For example, the CORESET transmission 204 and the PDSCH transmission 206 may transmit within the same frequency range. The SSB transmission 202 may transmit within a frequency range that overlaps and is smaller than the frequency range of the CORESET transmission 204 and the PDSCH transmission 206. Based on the timing and frequency of the elements within the multiplexing pattern 1 transmission arrangement 200, the multiplexing pattern 1 may be referred to as having time division multiplexing (TDM).

Figure 3:
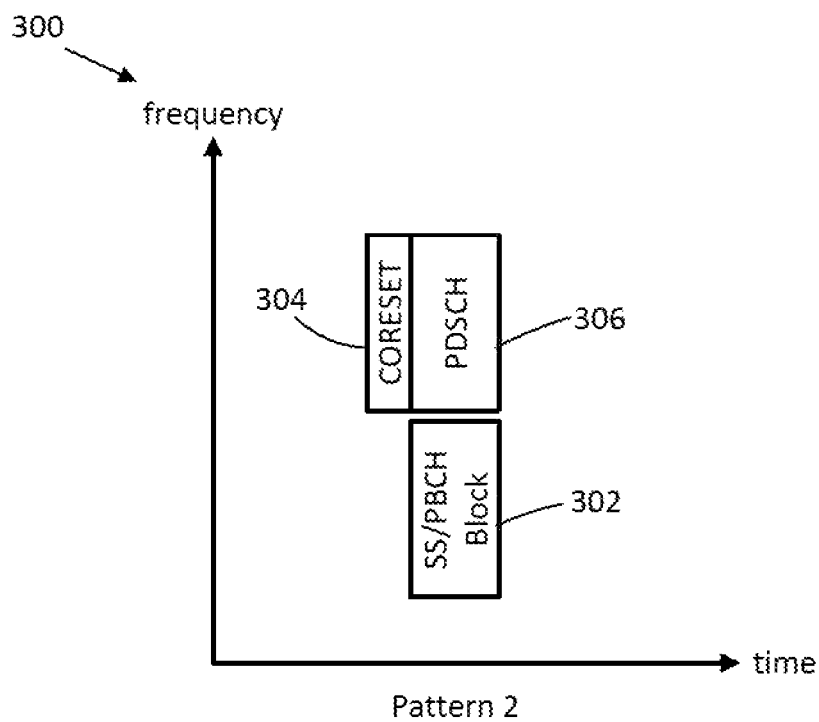
FIG. 3 illustrates an example multiplexing pattern 2 transmission arrangement for 120 kilohertz and 240 kilohertz synchronization signal/physical broadcast channel block in accordance with some embodiments.

FIG. 3 illustrates an example multiplexing pattern 2 transmission arrangement 300 for 120 kHz and 240 kHz SSB in accordance with some embodiments. In particular, FIG. 3 illustrates elements to be transmitted within the multiplexing pattern 2 transmission arrangement 300 on a frequency versus time graph. The multiplexing pattern 2 transmission arrangement 300 may define timing and frequency for elements transmitted within an SSB and CORESET multiplexing pattern.

The multiplexing pattern 2 transmission arrangement 300 may include an SSB transmission 302, a CORESET transmission 304, and a PDSCH transmission 306. Each of the SSB transmission 302, the CORESET transmission 304, and the PDSCH transmission 306 may comprise one or more symbols to be transmitted. As can be seen, the CORESET transmission 304 may be transmitted before both the SSB transmission 302 and the PDSCH transmission 306 in time. The SSB transmission 302 and the PDSCH transmission 306 may be transmitted at the same time. The CORESET transmission 304 may be transmitted right before the SSB transmission 302 and the PDSCH transmission 306 in time, such that the CORESET transmission 304 ends as the SSB transmission 302 and the PDSCH transmission 306 begins. The CORESET transmission 304 may transmit within the same frequency range as the PDSCH transmission 306. The SSB transmission 302 may transmit within a different frequency range than the CORESET transmission 304 and the PDSCH transmission 306. Based on the timing and frequency of the elements within the multiplexing pattern 2 transmission arrangement 300, the multiplexing pattern 2 may be referred to as having a combination of TDM and frequency division multiplexing (FDM).

Figure 4:
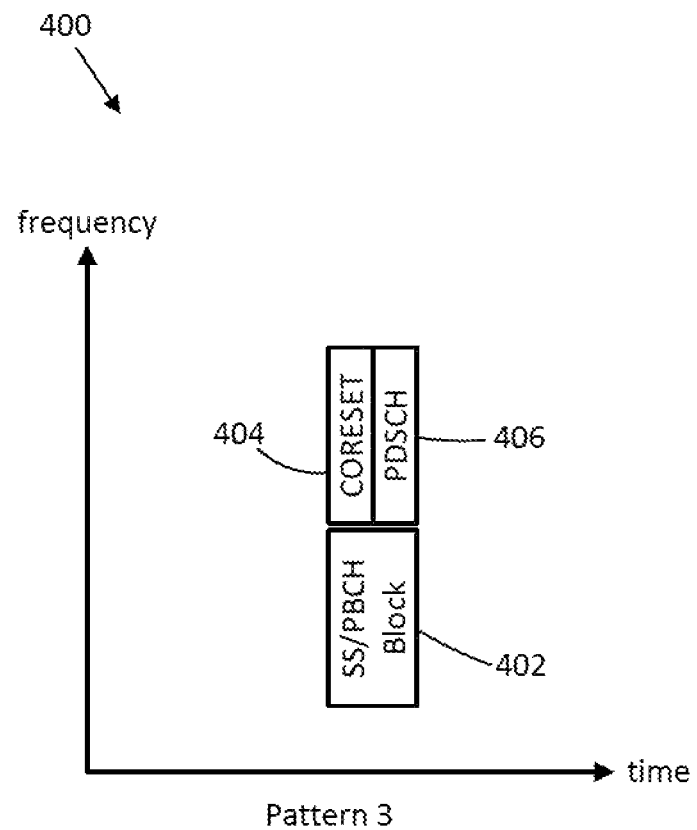
FIG. 4 illustrates an example multiplexing pattern 3 transmission arrangement for 120 kilohertz and 240 kilohertz synchronization signal/physical broadcast channel block in accordance with some embodiments.

FIG. 4 illustrates an example multiplexing pattern 3 transmission arrangement 400 for 120 kHz and 240 kHz SSB in accordance with some embodiments. In particular, FIG. 4 illustrates elements to be transmitted within the multiplexing pattern 3 transmission arrangement 400 on a frequency versus time graph. The multiplexing pattern 3 transmission arrangement 400 may define timing and frequency for elements transmitted within an SSB and CORESET multiplexing pattern.

The multiplexing pattern 3 transmission arrangement 400 may include an SSB transmission 402, a CORESET transmission 404, and a PDSCH transmission 406. Each of the SSB transmission 402, the CORESET transmission 404, and the PDSCH transmission 406 may comprise one or more symbols to be transmitted. The SSB transmission 402 may be transmitted at the same time as the CORESET transmission 402 and the PDSCH transmission 406. The CORESET transmission 404 may be transmitted before the PDSCH transmission 406 in time. For example, the CORESET transmission 404 may be transmitted right before the PDSCH transmission 406 in time, such that the CORESET transmission 404 ends as the PDSCH transmission 406 begins. The CORESET transmission 404 may be transmitted for a first portion of the time that the SSB transmission 402 is transmitted with the CORESET transmission 404 beginning at a same time as the SSB transmission 402 begins. The PDSCH transmission may be transmitted for a second portion of the time that the SSB transmission 402 is transmitted with the PDSCH transmission 406 ending at a same time as the SSB transmission 402 ends. The CORESET transmission 404 may be transmitted in a same frequency range as the PDSCH transmission 406. The SSB transmission 402 may be transmitted in a different frequency range than the CORESET transmission 404 and the PDSCH transmission 406. Based on the timing and frequency of the elements within the multiplexing pattern 3 transmission arrangement 400, the multiplexing pattern 3 may be referred as having FDM.

Due to the regulation limitations illustrated in FIG. 1, 23 dBm/MHz EIRP limitation is used excluding point to point outdoor transmission with >30 dBi antenna gain for the European Union (EU). Further, the average 40 dBm EIRP is for indoor wireless access system for the FCC.

Multiplexing pattern 1 (TDD) (as illustrated by the multiplexing pattern 1 transmission arrangement 200 (FIG. 2) may be the desirable nmltiplexing pattern for greater than 52.6 GHz transmission. For SSB with 120 kHz subcarrier spacing, 20 RB SSB transmission can use maximum of 23+10*log 10(120*12*20/1000)=37.6 dBm EIRP. For SSB with 240 kHz subcarrier spacing, maximum 40 dBm EIRP may be used.

The approaches described in this disclosure may focus on multiplexing pattern 1 signaling, where the SSB pattern may reuse frequency range 2 (FR2) 120 kHz or 240 kHz. Two considerations related to SIB1 transmission are coverage and capacity. With TDM CORESET and SSB, SIB1 transmission with 480 kHz or 960 kHz may have limited coverage, due to short slot time and maximum EIRP limitation, compared to SIB1 transmission in FR2. SIB1 may typically contain hundreds of bits. Legacy radio layer 1 (RAN1) allows maximum transport block size (TBS) of 2976 bits. With the fixed EIRP, SIB1 coverage may be an issue compared with SSB for greater than 52.6 GHz transmission even with the same SC'S. An approach of this disclosure is to allow SIB1 transmission across multiple slots to ensure similar SIB1 coverage/capacity compared to SSB. The design may apply to SIB SCS of 120 kHz, 480 kHz. or 960 kHz.

In NR, CORESET 0 transmission slots may be derived based on 0 and M value in table 13-11 of TS 38.213 (3GPP Organizational Partners. (2020-12). 3$^{rd}$ Generation Partnership Project: Technical Specification Group Radio Access Network; NR; Physical layer procedures for control (Release 16) (3GPP IS 38.213 V. 16.4.0)) (CORESET multiplexing pattern 1 and FR2) and Table 13-12 of TS 38.213 (CORESET multiplexing pattern 1 and FR2), $n_0 = (O \cdot 2^\mu + \lfloor i \cdot M \rfloor) \bmod N_{slot}^{frame,\mu}$, where CORESET 0 is transmitted at even frame when $\lfloor (O \cdot 2^\mu + \lfloor i \cdot M \rfloor)/N_{slot}^{frame,\mu} \rfloor \bmod 2 = 0$, and CORESET 0 is transmitted at odd frame when $\lfloor (O \cdot 2^\mu + \lfloor i \cdot M \rfloor)/N_{slot}^{frame,\mu} \rfloor \bmod 2 = 1$, $n_0$ may be defined as the index slot, O may indicate which frames are going to be used within a subframe to distributing time domain, $\mu \in \{0,1\}$ based on a SCS for physical downlink receptions in a CORESET, i may be a candidate SSB index, M may be the number of slots per SSB, and $N_{slot}^{frame,\mu}$ may be a number of slots per frame for $\mu$. Approaches described herein may modify M value in table 13-12 (as shown in FIG. 5 and FIG. 6) to allow larger M, such as 4 or 8 for 480 kHz and 960 kHz SCS. Having M being larger may create more opportunities for SIB1. For example, the larger M may create more transmission opportunities for SIB1 in case LBT fails.

FIG. 5 illustrates example parameters for PDCCH monitoring occasions for Type0-PDCCH common search space (CSS)-SSB and CORESET multiplexing pattern 1 and FR2 in accordance with some embodiments. In particular. FIG. 5 illustrates a table 500 of the parameters.

The parameters include number of search space sets per slot parameters 502 and M value parameters 504 for the PDCCH monitoring occasions. A first box 506 highlights the number of search space sets per slot parameters that 502 that are to be updated by the approaches described herein for frequency range 3 (FR3). FR3 being greater than 52.6 GHz. A second box 508 highlights the M value parameters 504 that are to be updated by the approaches described herein.

FIG. 6 illustrates example parameters for FR3 in accordance with some embodiments. In particular, FIG. 6 illustrates example parameters for PDCCH monitoring occasions for Type0-PDCCH CSS-SSB and CORESET multiplexing patter 1 and FR3. FIG. 6 illustrates a table 600 of the parameters.

The table 600 may be for FR3, and the M value parameters 602 may have allowable M values of 1, 2, 4, and 8. The M value parameters 602 may be defined as different values corresponding to different index parameters 604. For example, the M value parameters 602 may be defined to be equal to 1 for index parameter values of 0, 4, 8, and 12. The M value parameters 602 may be defined to be equal to 2 for index parameter values of 1, 5, 9, and 13. The M value parameters 602 may be defined to be equal to 4 for index parameter values of 2, 6, 10, and 14. The M value parameters 602 may be defined to be equal to 8 for index parameter values of 3, 7, 11, and 15. The number of search space sets per slots parameters 606 may be updated to be equal to 1 for all values of the index parameters 604. The index slot for FR3 may be defined by the equation $n_0 = (O \cdot 2^\mu + \lfloor i \cdot M \rfloor) \bmod N_{slot}^{frame,\mu}$ with the parameters provided in the table 600. The larger M values (for example, M values larger than 1) may allow multiple slots between each SSB index.

Having M being larger may create more opportunities for SIB1. For example, the larger M may create more transmission opportunities for SIB1 in case LBT fails. In particular, SIB1 may utilize LBT, whereas the SSB may be transmitted as short control signaling without LBT. However, having LBT fail may cause issues for the SIB1. By having multiple potential SIB1 slots per SSB, there may be more transmission opportunities in case some slots fail LBT.

In the CORESET 0 configuration time domain, SIB1 PDSCH can repeat across different slots to extend the range.

For example, a SIB1 transmission may be transmitted in multiple slots in the CORESET 0 configuration time domain, where being transmitted in multiple slots may extend the range for the SIB1 transmission. The multiple slots in which the SIB1 transmission may be consecutive.

Figure 7:
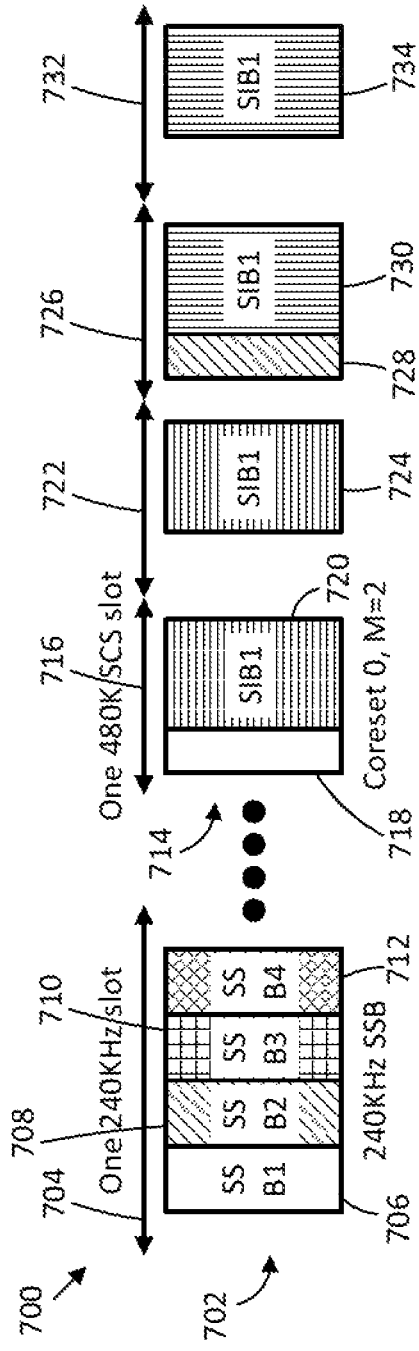
FIG. 7 illustrates an example control resource set 0 configuration time domain arrangement in accordance with some embodiments.

FIG. 7 illustrates an example CORESET 0 configuration time domain arrangement 700 in accordance with some embodiments. In particular, the CORESET 0 configuration time domain arrangement 700 illustrated may have a CORESET value of 0 and an M value of 2. The CORESET configuration time domain arrangement 700 may define a format transmissions of a SIB1 from a gNB (such as the gNB 1600 (FIG. 16)) to a UE (such as the UE 1500 (FIG. 15)).

The CORESET 0 configuration time domain arrangement 700 illustrates a 240 kHz SSB transmission 702. The SSB transmission 702 may comprise one 240 kHz slot 704. The slot 704 may include a first SSB (SSB1) 706, a second SSB (SSB2) 708, a third SSB (SSB3) 710, and a fourth SSB (SSB4) 712.

The CORESET 0 configuration time domain arrangement 700 further illustrates a portion of a 480 kHz SIB1 transmission arrangement 714. The SIB1 transmission arrangement 714 may correspond to the SSB transmission 702. The SIB1 transmission arrangement 714 may comprise a plurality of 480 kHz SCS slots. A first 480 kHz SCS slot 716 may include a CORESET 718 and a SIB1 720, where the CORESET 718 and the SIB1 720 correspond to the SSB1 706. A second 480 kHz SCS slot 722 may include a repetition of the SIB1 724, where the repetition of the SIB1 724 is the same as the SIB1 720 and the second SCS slot 722 is sequential to the first SCS slot 716. The number of repetitions of the SIB1 may be defined based on the value of M. In particular, as the value of M is 2 in the illustrated embodiment, the SIB1 720 is included in the first SCS slot 716 and repeated in the second SCS slot 722 as the repetition of the SIB1 724 for a total of two repetitions. The CORESET 718, the SIB1 720, and the repetition of the SIB1 724 may correspond to the SSB1 706.

A third 480 kHz SCS slot 726 may include a CORESET 728 and a SIB1 730, where the CORESET 728 and the SIB1 730 correspond to the SSB2 708. The third SCS slot 726 may be sequential to the second SCS slot 722. A fourth 480 kHz slot 732 may include a repetition of the SIB1 732, where the repetition of the SIB1 734 is the same as the SIB1 730 and the fourth SCS slot 732 is sequential to the third SCS slot 726. The CORESET 728, the SIB1 730, and the repetition of the SIB1 734 may correspond to the SSB2 708. As with the SIB1 within the first SCS slot 716 and the second SCS slot 722, the number of repetitions of the SIB1 corresponding to the SSB2 708 may be defined based on the value of M. In particular, as the value of M is 2 in the illustrated embodiment, the SIB1 730 is included in the third SCS slot 726 and repeated in the fourth SCS slot 732 as the repetition of the SIB1 734 for a total of two repetitions. While not shown, it should be understood that the SIB1 transmission arrangement 714 may include CORESETs and SIB1s corresponding to the SSB3 710 and the SSB4 712. In particular, the SIB1 transmission arrangement 714 may include additional SCS slots for CORESETs and SIB1s corresponding to the SSB3 710 and the SSB4 712 with similar configurations to the first SCS slot 716 through the fourth SCS slot 732.

Having multiple slots and multiple potential search space may provide more transmission opportunities in case any of the slots fail LBT. For example, the SIB1 may require LBT. In case the LBT fails in one of the slots (such as the first SCS slot 716), the SIB1 in the next slot (such as the second SCS slot 722) may provide another opportunity for the LBT to be successful and the SIB1 to be transmitted. For example, if a gNB implementing the CORESET 0 configuration time domain arrangement 700 has the LBT fail for the first SCS slot 716, the SIB1 720 may not be transmitted in the first SCS slot 716. However, the gNB may attempt LBT for the second SCS slot 722 providing for another opportunity for the SIB1 to be transmitted. If the LBT succeeds for the second SCS slot 722, the SIB1 724 may be transmitted in the second SCS slot 722, thereby addressing the issue of the SIB1 720 not being transmitted in the first SCS slot 716. Accordingly, transmission of the SIB1 may still be successful if the LBT is successful in any of the slots in which the SIB1 is transmitted, including the repetition of the SIB1.

Figure 8:
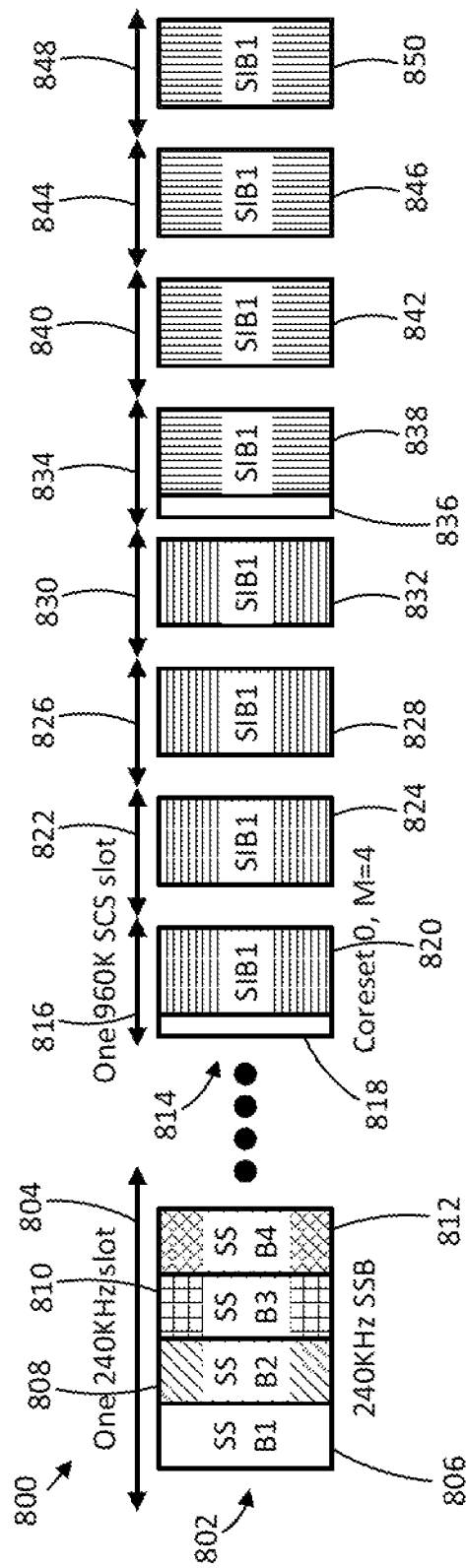
FIG. 8 illustrates another example control resource set 0 configuration time domain arrangement in accordance with some embodiments.

FIG. 8 illustrates another example CORESET 0 configuration time domain arrangement 800 in accordance with some embodiments. In particular, the CORESET 0 configuration time domain arrangement 800 illustrated may have a CORESET value of 0 and an M value of 4. The CORESET configuration time domain arrangement 800 may define a format transmissions of a SIB1 from a gNB (such as the gNB 1600 (FIG. 16)) to a UE (such as the UE 1500 (FIG. 15)).

The CORESET 0 configuration time domain arrangement 800 illustrates a 240 kHz SSB transmission 802. The SSB transmission 802 may comprise one 240 kHz slot 804. The slot 804 may include a first SSB (SSB1) 806, a second SSB (SSB2) 808, a third SSB (SSB3) 810, and a fourth SSB (SSB4) 812.

The CORESET 0 configuration time domain arrangement 800 further illustrates a portion of a 960 kHz SIB1 transmission arrangement 814. The SIB1 transmission arrangement 814 may correspond to the SSB transmission 802. The SIB1 transmission arrangement 814 may comprise a plurality of 960 kHz SCS slots. A first 960 kHz SCS slot 816 may include a CORESET 818 and a SIB1 820, where the CORESET 818 and the SIB1 820 correspond to the SSB1 806. A second 960 kHz SCS slot 822 may include a repetition of the SIB1 824, where the repetition of the SIB1 824 is the same as the SIB1 820 and the second SCS slot 822 is sequential to the first SCS slot 816. A third 960 kHz SCS slot 826 may include a repetition of the SIB1 828, where the repetition of the SIB1 828 is the same as the SIB1 820 and the third SCS slot 826 is sequential to the second SCS slot 822. A fourth 960 kHz SCS slot 830 may include a repetition of the SIB1 832, where the repetition of the SIB1 832 is the same as the SIB1 820 and the fourth SCS slot 830 is sequential to the third SCS slot 826. The number of repetitions of the SIB1 may be defined based on the value of M. In particular, as the value of M is 4 in the illustrated embodiment, the SIB1 820 is included in the first SCS slot 816 and repeated in the second SCS slot 822 as the repetition of the SIB1 824, repeated in the third SCS slot 826 as the repetition of the SIB1 828, and repeated in the fourth SCS slot 830 as the repetition of the SIB1 832 for a total of four repetitions. The CORESET 818, the SIB1 820, the repetition of the SIB1 824, the repetition of the SIB1 828, and the repetition of SIB1 832 may correspond to the SSB1 806.

A fifth 960 kHz SCS slot 834 may include a CORESET 836 and a SIB1 838, where the CORESET 836 and the SIB1 838 correspond to the SSB1 808. A sixth 960 kHz SCS slot 840 may include a repetition of the SIB1 842, where the repetition of the SIB1 842 is the same as the SIB1 838 and the sixth SCS slot 840 is sequential to the fifth SCS slot 834. A seventh 960 kHz SCS slot 844 may include a repetition of the SIB1 846, where the repetition of the SIB1 846 is the same as the SIB1 838 and the seventh SCS slot 844 is sequential to the sixth SCS slot 840. An eighth 960 kHz SCS slot 848 may include a repetition of the SIB1 850, where the repetition of the SIB1 850 is the same as the SIB1 838 and the eighth SCS slot 848 is sequential to the seventh SCS slot 844. The number of repetitions of the SIB1 may be defined based on the value of M. In particular, as the value of M is 4 in the illustrated embodiment, the SIB1 838 is included in the fifth SCS slot 834 and repeated in the sixth SCS slot 840 as the repetition of the SIB1 842, repeated in the seventh SCS slot 844 as the repetition of the SIB1 846, and repeated in the eighth SCS slot 848 as the repetition of the SIB1 850 for a total of four repetitions. The CORESET 836, the SIB1 838, the repetition of the SIB1 842, the repetition of the SIB1 846, and the repetition of SIB1 850 may correspond to the SSB1 808. While not shown, it should be understood that the SIB1 transmission arrangement 814 may include CORE-SETs and SIB1s corresponding to the SSB3 810 and the SSB4 812. In particular, the SIB1 transmission arrangement 814 may include additional SCS slots for CORESETs and SIB1s corresponding to the SSB3 810 and the SSB4 812 with similar configurations to the first SCS slot 816 through the eighth SCS slot 848.

The SIB1 PDSCH can repeat across different slots to extend range. In some embodiments when M is greater than 1, the SIB1 is repeated for all M slots. For example, the gNB may send the SIB1 to the UE in all the slots indicated by the M value. In some embodiments, an indication of the number of repetitions of the SIB1 within the slots may be provided. For example, the gNB may provide an indication of the number of repetitions of the SIB 1 within the slots to the UE. Legacy downlink control information (DCI) Format 1-0 scrambled with system information-radio network temporary identifier (SI-RNTI) has 15 reserved bits. 2 bits can be used to indicate the SIB1 repetition over slots. For example, the DCI-Format 1-0 scrambled with the SI-RNTI may include two bits that indicate the M value.

In some embodiments, the repeated SIB1 transmission can be treated as one SIB1 group, where no UL transmission is allowed. In particular, the repeated SIB1 may be treated as one SIB1 group and UL transmissions may not be allowed between the SIB1. For example, the SIB1 720 (FIG. 7) and the repetition of the SIB1 724 (FIG. 7) may be treated as one SIB1 group, where UL transmissions may not be allowed between the SIB1 and the repetition of the SIB1. This may ensure phase continuation between SIB1 transmission to improve cross slot channel estimation.

Having multiple slots and multiple potential search space may provide more transmission opportunities in case any of the slots fail LBT. For example, the SIB1 may require LBT. In case the LBT fails in one of the slots (such as the first 960 kHz SCS slot 816), the SIB1 in the following slots (such as the second 960 kHz SCS slot 822, the third 960 kHz SCS slot 826, and the fourth 960 kHz SCS slot 830) may provide additional opportunities for the LBT to succeed. For example, if a gNB implementing the CORESET 0 configuration time domain arrangement 800 has the LBT fail for the first SCS slot 816, the SIB1 820 may not be transmitted in the first SCS slot 816. However, the gNB may attempt LBT for the second SCS slot 822 providing for another opportunity for the SIB1 to be transmitted. If the LBT succeeds for the second SCS slot 822, the SIB1 824 may be transmitted in the second SCS slot 822, thereby addressing the issue of the SIB1 820 not being transmitted in the first SCS slot 816. Accordingly, transmission of the SIB1 may still be successful if the LBT is successful in any of the slots in which the SIB1 is transmitted, including the repetitions of the SIB1.

A UE that receives repeated SIBs may coherently combine the SIBs to determine the information included in the SIBs. For example, a UE that receives a transmission in accordance with the SIB1 transmission arrangement 714 (FIG. 7), including the SIB1 720 and the repetition of the SIB1 724, the UE may coherently combine the SIBs in accordance with the number of repetitions. In some embodiments, all the repeated SIB1 may be coherently combined to determine the information. For example, the UE may coherently combine the SIB1 720 and the repetition of the SIB1 724 to determine the information included in the SIB1 720. In other embodiments, a portion of the repeated SIB1 may be coherently combined to achieve a certain reliability as to the determination of the information included in the SIB1. For example, the UE may process the SIB1 720 and then determine whether a certain relation as to the determination of the information included in the SIB1 720 has been achieved. If the reliability has not been achieved, the UE may process the repetition of the SIB1 724 and coherently combine the repetition of the SIB1 724 with the SIB1 720. The process may continue coherently combining the repetitions of the SIB1 until the reliability has been achieved or all the repeated SIB1 have been processed and coherently combined. Coherently combining the repeated SIB1 may include combining or selecting the most reliable information from the repeated SIB1.

The above describes CORESET 0 configuration within the time domain. CORESET 0 configuration may be performed in the frequency domain as well. In NR. 4 bits MSB of pdcch-ConfigSIB1 in master information block (MIB) may define the multiplexing pattern, the number of RBs, the number of symbols, the offset RB, etc. for CORESET 0 configuration within the frequency domain. FIG. 9 illustrates an example MIB information element 900 in accordance with some embodiments. The MIB information element 900 may include a PDCCH configuration SIB1 (pdcch-ConfigSIB1) value 902. The pdcch-ConfigSIB1 value 902 may have the four MSB that define the multiplexing pattern, the number of RBs, the number of symbols, the offset RB, etc. One additional bit for subcarrierspacingCommon in MIB to indicate maximum 2 combination of, 480 kHz or 960 kHz. For example, the MIB information element 900 may further include a subcarrier spacing common (subCamerSpacingCommon) value 904. A bit of the subCarrierSpacingConnuon value 904 may indicate 480 kHz or 960 kHz for the SCS. Legacy approach has 1 or 2 SCS out of 480 kHz and 960 kHz being supported. This additional bit of the subCamerSpacingCommon can reuse the bit saved if only pattern 1 multiplexing is used.

Additional table of "Set of resource blocks and slot symbols for CORESET for type0-pdcch search space set when SSPBCH block, PDCCH SCS" is to be defined. Number of RBs can be 8 (max EIRP may be achieved with 480 kHz SCS), 16, 24, 48. Number of symbols can be 1, 2, 3.

Figure 10:
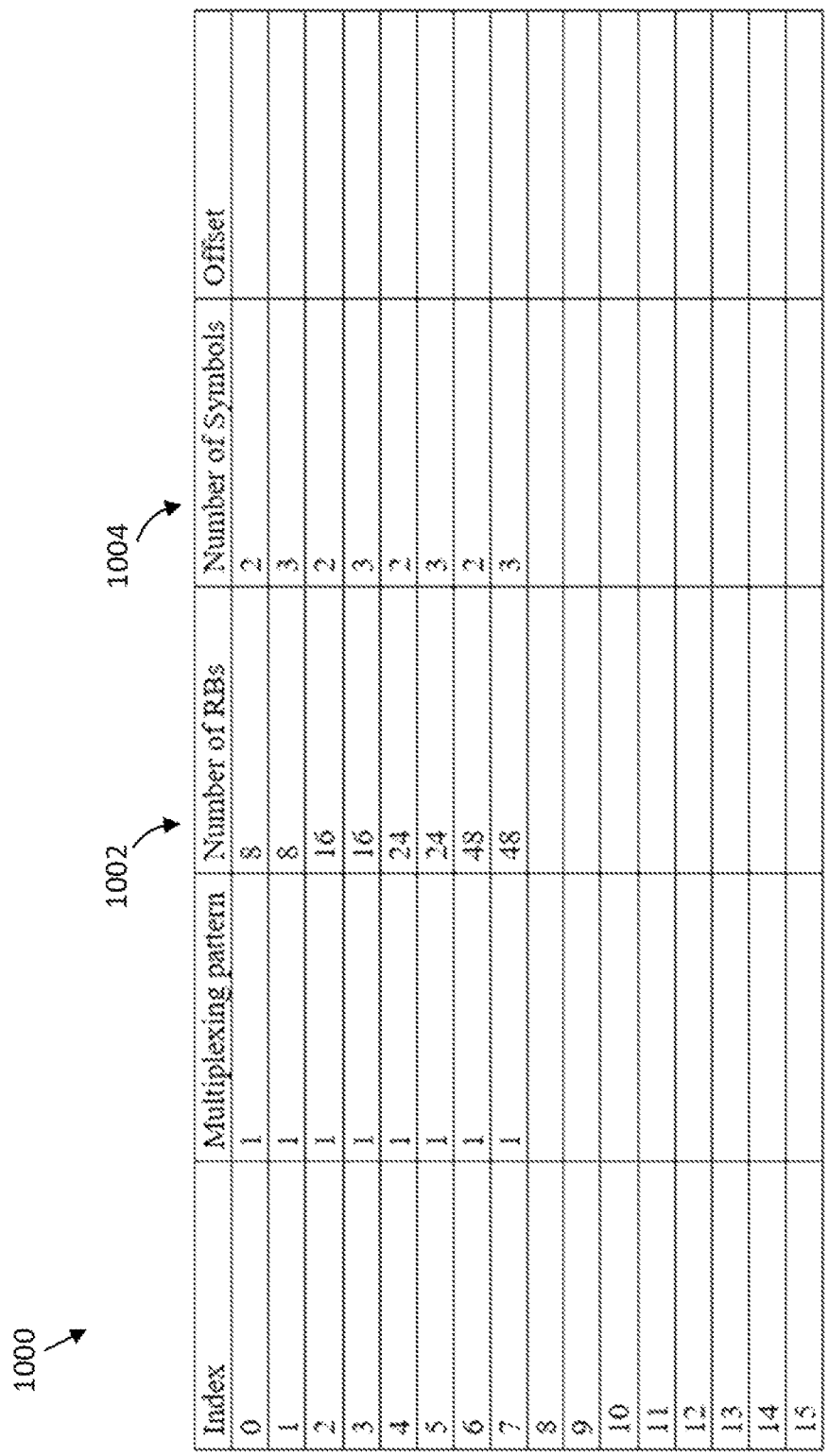
FIG. 10 illustrates example details of synchronization signal/physical broadcast channel block and physical downlink control channel subcarrier spacing of {240, 480} in accordance with some embodiments.

FIG. 10 illustrates example details of SSPBCH block and PDCCH SCS of (240, 480) in accordance with some embodiments. In particular. FIG. 10 illustrates an example table 1000 with details of the SSB and PDCCH SCS for 480 kHz for the SCS. As can be seen, the number of RBs 1002 have values of 8, 16, 24, and 48, and the number of symbols 1004 have values of 2 and 3. For example, index 1 may have number of RBs 1002 equal to 8 and a number of symbols 1004 equal to 3. Index 3 may have a number of RBs 1002 equal to 16 and a number of symbols 1004 equal to 3. The details included in the table 100 may define the CORESET 0 configuration in the frequency domain.

Figure 11:
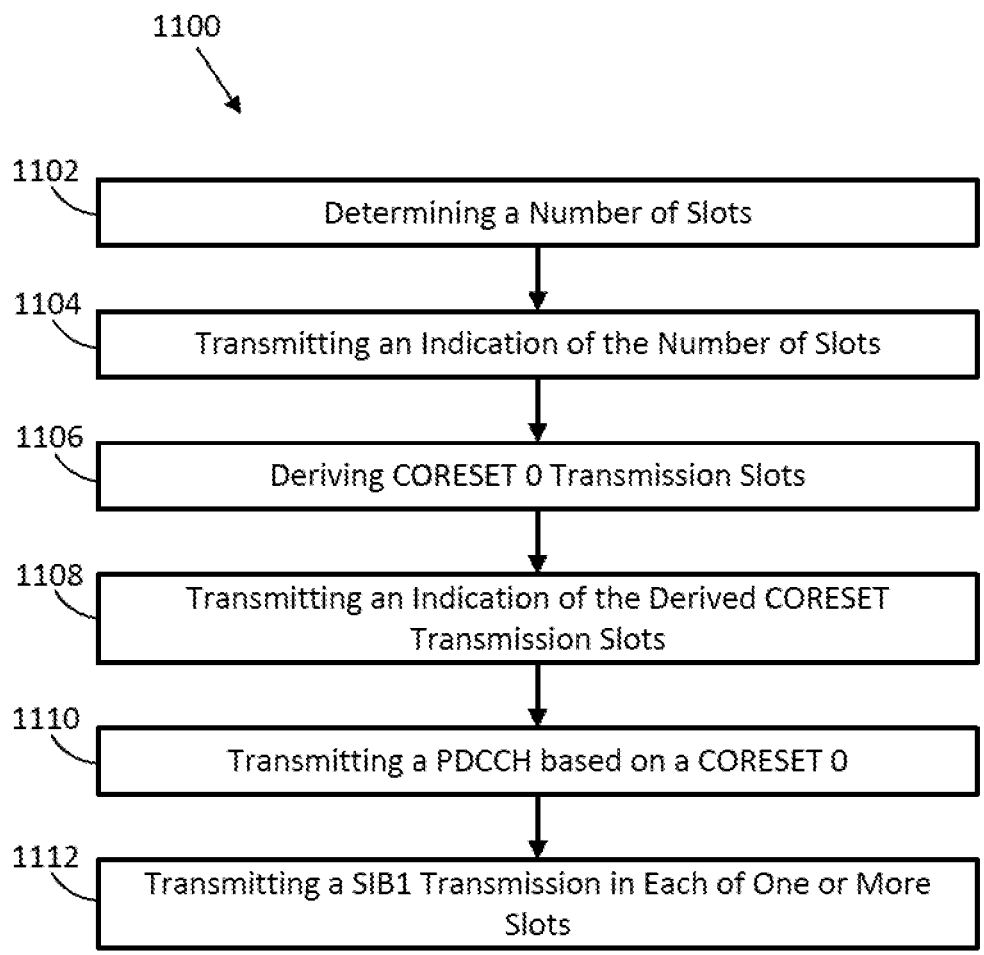
FIG. 11 illustrates an example procedure for providing repeated system information block type 1 transmission in accordance with some embodiments.

FIG. 11 illustrates an example procedure 1100 for providing repeated SIB1 transmission in accordance with some embodiments. In particular, the procedure 1100 may comprise providing a number of slots with the SIB1 transmission repeated in the number of slots. The procedure 1100 may be performed by a gNB (such as the gNB 1600 (FIG. 16)). The procedure 1100 may be performed for SIB1 transmissions at a frequency of greater than 52.6 GHz. The procedure 1100, or portions thereof, may be performed in accordance with the processes described throughout this disclosure.

The procedure 1100 may include determining a number of slots in 1102. In particular, the gNB may determine a number of slots in which to repeat a SIB1 transmission to be coherently combined. Determining the number of slots may include determining an M value for index slot for a CORESET 0 configuration. The number of slots may be determined to achieve a predetermined reliability of the SIB1 transmissions.

The procedure 1100 may include transmitting an indication of the number of slots in 1104. In particular, the gNB may transmit an indication of the number of slots in which to repeat the SIB1 transmission to a UE (such as the UE 1500 (FIG. 15)). In some embodiments, the indication of the number of slots may comprise two bits in a PDCCH transmission, where the two bits indicate the number of slots. The PDCCH transmission may be in DCI format 1-0.

The procedure 1100 may include deriving CORESET 0 transmission slots in 1106. In particular, the gNB may derive the CORESET 0 transmission slots with a number of slots per SSB being greater than 2. Deriving the CORESET 0 transmission slots may be include calculating an index for a slot $n_0$ based on the equation $n_0 = (O \cdot 2^\mu + \lfloor i \cdot M \rfloor) \bmod N_{slot}^{frame,\mu}$ where CORESET 0 is transmitted at even frame when $\lfloor (O \cdot 2^\mu + \lfloor i \cdot M \rfloor)/N_{slot}^{frame,\mu} \rfloor \bmod 2 = 0$, and CORESET 0 is transmitted at odd frame when $\lfloor (O \cdot 2^\mu + \lfloor i \cdot M \rfloor)/N_{slot}^{frame,\mu} \rfloor \bmod 2 = 1$, $n_0$ may be defined as the index slot, O may indicate which frames are going to be used within a subframe to distributing time domain, $\mu \in (0,1)$ based on a SCS for physical downlink receptions in a CORESET, i may be a candidate SSB index, M may be the number of slots per SSB, and $N_{slot}^{frame,\mu}$ may be a number of slots per frame for $\mu$.

The procedure 1100 may include transmitting an indication of the derived CORESET transmission slots. In particular, the gNB may transmit an indication of the derived CORESET 0 transmission slots to the UE. For example, the gNB may transmit an indication of the derived CORESET 0 transmission slots derived in 1106.

The procedure 1100 may include transmitting a PDCCH based on a CORESET 0 in 1110. In particular, the gNB may transmit the PDCCH based on the CORESET 0 in a first portion of the slots in which the SIB1 to be transmitted. In some embodiments, the number of slots in which the PDCCH is transmitted may be less than the number of slots in which the SIB1 transmissions are to be transmitted. For example, the PDCCH may be transmitted in one slot while the SIB1 transmissions are to be transmitted in multiple slots including the slot in which the PDCCH is transmitted.

The procedure 1100 may include transmitting a SIB1 transmission in each of one or more slots in 1112. In particular, the gNB may transmit the SIB1 transmission in each of one or more slots equal to the number of slots determined in 1102 to the UE. Accordingly, the SIB1 transmission may be repeated in multiple slots, where the UE may be to coherently combine the SIB1 transmission in the multiple slot.

In some embodiments, transmitting the SIB1 transmission may include performing LBT operations for each of the one or more slots. In particular, the gNB may perform the LBT operations for each of the one or more slots. The gNB may transmit the SIB1 transmission in each of the slots based on the LBT operations being successful. For example, the LBT operations may indicate that the slots are available for the transmission of the SIB1.

Figure 12:
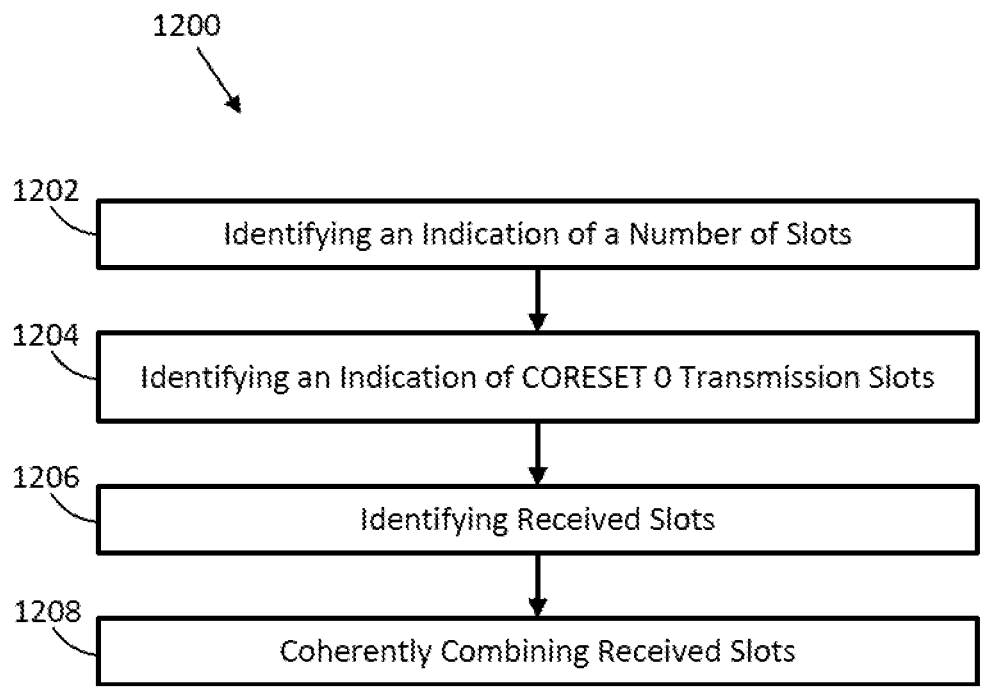
FIG. 12 illustrates a procedure for providing processing repeated system information block type 1 transmissions in accordance with some embodiments.

FIG. 12 illustrates a procedure 1200 for providing processing repeated SIB1 transmissions in accordance with some embodiments. The procedure 1200 may be performed by a UE (such as the UE 1500 (FIG. 15)). The procedure 1100 may be performed for SIB1 transmissions at a frequency of greater than 52.6 GHz. The procedure 1200, or portions thereof may be performed in accordance with the processes described throughout this disclosure.

The procedure 1200 may include identifying an indication of a number of slots in 1202. In particular, the UE may identify an indication of a number of slots in which a SIB1 is to be repeated received from a gNB (such as the gNB 1600 (FIG. 16)). Identifying the number of slots may include identifying bits with a PDCCH transmission that indicates the number of slots. In some embodiments, two bits within the PDCCH may indicate the number of slots.

The procedure 1200 may include identifying an indication of CORESET transmission slots in 1204. In particular, the UE may identify an indication of the CORESET 0 transmission slots received from the gNB. The CORESET 0 transmission slots may have a number of slots per SSB greater than 2.

The procedure 1200 may include identifying received slots in 1206. In particular, the UE may identify received slots including the SIB1 based on the indication of the number of slots in 1202. The slots may be provided to the UE by the gNB. The received slots may be within the FR3, where FR3 is greater than 52.6 GHz.

The procedure 1200 may include coherently combining the received slots in 1208. In particular, the UE may coherently combine one or more of the received slots to determine information included in the SIB1. In some embodiments, the UE may combine all the received slots to determine the information included in the SIB1. In other embodiments, coherently combining the received slots may include combining an amount of the one or more of the received slots needed to adequately determine the information included in the SIB1. The information included in the SIB1 may be adequately determined by meeting a desired reliability as to the information. In some embodiments, the received slots that include the SIB1 may be treated as a SIB1 group, where no UL transmissions may be allowed between the received slots.

Figure 13:
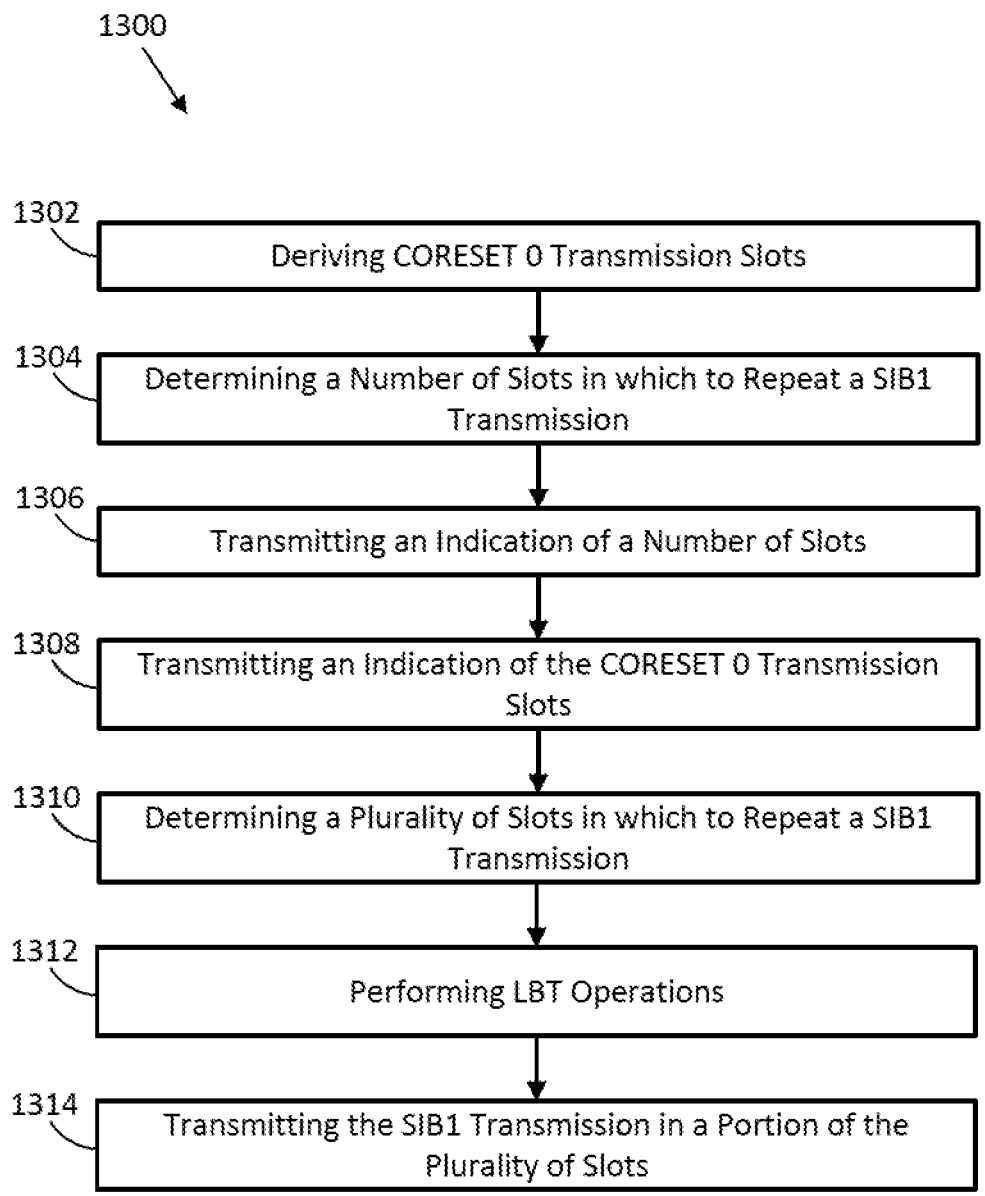
FIG. 13 illustrates an example procedure for providing indication of a number of slots in which system information block type 1 transmissions are to be repeated in accordance with some embodiments.

FIG. 13 illustrates an example procedure 1300 for providing indication of a number of slots in which SIB1 transmissions are to be repeated in accordance with some embodiments. The procedure 1300 may be performed by a gNB (such as the gNB 1600 (FIG. 16)). The procedure 1300 may be performed for SIB1 transmissions at a frequency of greater than 52.6 GHz. The procedure 1300, or portions thereof, may be performed in accordance with the processes described throughout this disclosure.

The procedure 1300 may include deriving CORESET 0 transmission slots in 1302. In particular, the gNB may derive CORESET 0 transmission slots for SIB1 transmissions with a number of slots per SSB being greater than 2. Deriving the CORESET 0 transmissions may including calculating an index of slot $n_0$ via the equation $n_0 = (O \cdot 2^\mu + \lfloor i \cdot M \rfloor) \bmod N_{slot}^{frame,\mu}$, where O indicates which frames are going to be used within a subframe to distributing time domain, $\mu\in\{0,1\}$ based on a subcarrier spacing (SCS) for physical downlink receptions in a CORESET, i is a candidate SSB index, M is the number of slots per SSB and is greater than 2, and $N_{slot}^{frame,\mu}$ is a number of slots per frame for p. An indication of the derived CORESET 0 transmission slots in a memory of the gNB.

The procedure 1300 may include determining a number of slots in which to repeat a SIB1 transmission in 1304. In particular, the gNB may determine a number of slots in which to repeat a SIB1 transmission within the CORESET 0 transmission slots. Determining the number of slots may comprise determine a M value in some embodiments.

The procedure 1300 may including transmitting an indication of a number of slots in 1306. In particular, the gNB may transmit an indication of the number of slots in which the SIB1 transmission is to be repeated and coherently combined. The gNB may transmit the indication to a UE (such as the UE 1500 (FIG. 15)) and the UE may be to coherently combine the repeated SIB1 transmissions in the slots. In some embodiments, the indication of the number of slots may comprise two bits in a PDCCH transmission of DCI format 1-0 that indicates the number of slots.

The procedure 1300 may include transmitting an indication of the CORESET 0 transmission slots in 1308. In particular, the gNB may transmit the indication of the CORESET 0 transmissions to the UE via a PDCCH transmission.

The procedure 1300 may include determining a plurality of slots in which to repeat a SIB1 transmission in 1310. In particular, the gNB may determine a plurality of slots in which to repeat a SIB1 to the UE within the CORESET 0 transmissions slot. For example, the plurality of slots may be determined based on the CORESET 0 transmission slots and/or the M value.

The procedure 1300 may include performing LBT operations in 1312. In particular, the gNB may perform LBT operations on the plurality of slots. The gNB may determine whether the SIB1 transmission may be transmitted to the UE with the slots based on whether the LBT operations are successful. A successful LBT operation may indicate that the slot is available for transmission of the SIB1 transmission, while an unsuccessful LBT operation may indicate that the slot is not available for transmission of the SIB1 transmission. The gNB may determine which slots are available for transmission of the SIB1 transmission and which slots are unavailable for transmission of the SIB1 transmission based on the results of the LBT operations.

The procedure 1300 may include transmitting the SIB1 transmission in a portion of the plurality slots in 1314. In particular, the gNB may transmit the SIB1 transmission in the portion of the plurality of slots for which the LBT operation was successful.

Figure 14:
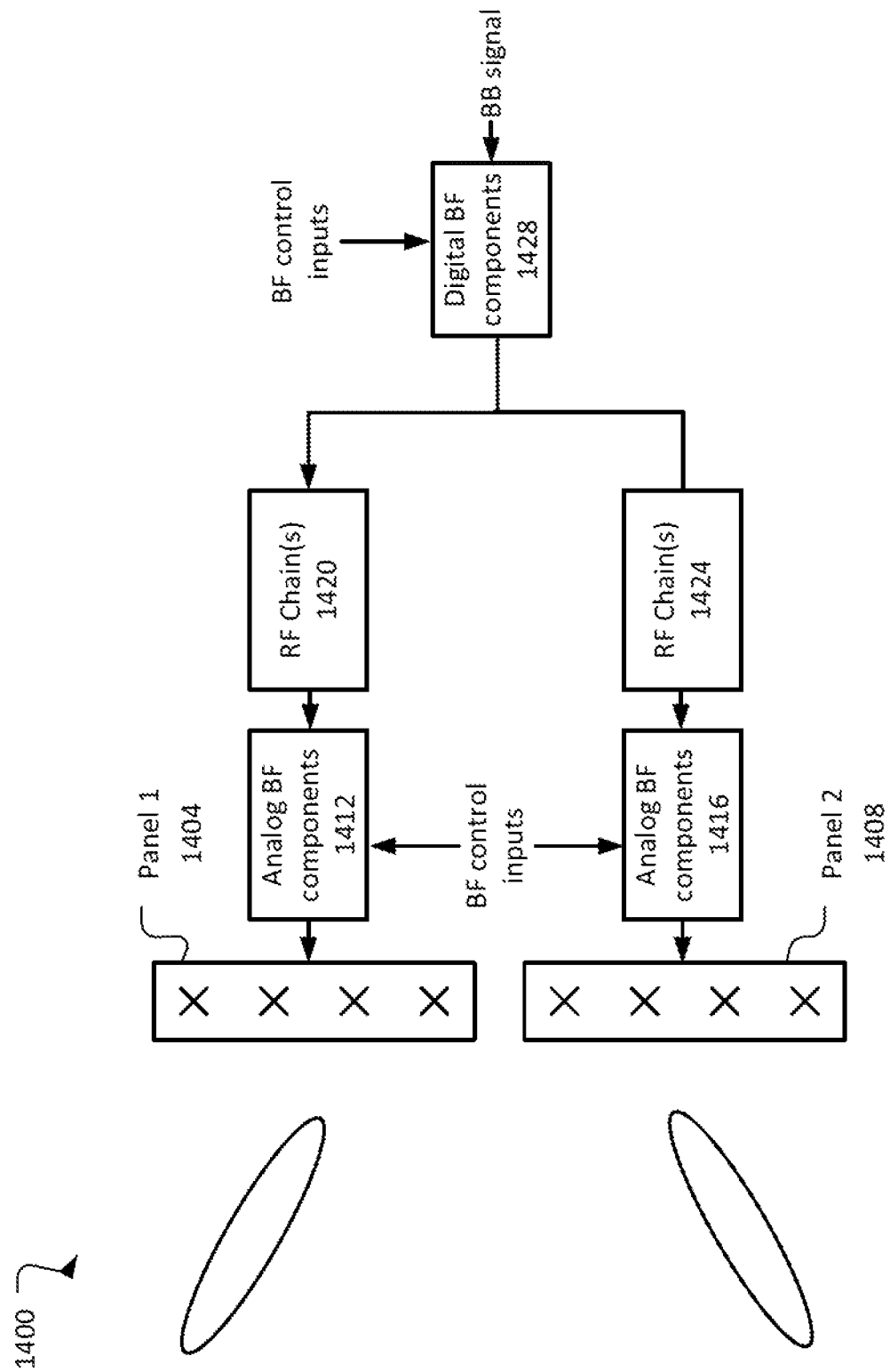
FIG. 14 illustrates example beamforming circuitry in accordance with some embodiments.

FIG. 14 illustrates example beamforming circuitry 1400 in accordance with some embodiments. The beamforming circuitry 1400 may include a first antenna panel, panel 1 1404, and a second antenna panel, panel 2 1408. Each antenna panel may include a number of antenna elements. Other embodiments may include other numbers of antenna panels.

Digital beamforming (BF) components 1428 may receive an input baseband (BB) signal from, for example, a baseband processor such as, for example, baseband processor 1504A of FIG. 15. The digital BF components 1428 may rely on complex weights to pre-code the BB signal and provide a beamformed BB signal to parallel radio frequency (RF) chains 1420/1424.

Each RF chain 1420/1424 may include a digital-to-analog converter to convert the BB signal into the analog domain; a mixer to mix the baseband signal to an RF signal; and a power amplifier to amplify the RF signal for transmission.

The RF signal may be provided to analog BF components 1412/1416, which may apply additionally beamforming by providing phase shifts in the analog domain. The RF signals may then be provided to antenna panels 1404/1408 for transmission.

In some embodiments, instead of the hybrid beamforming shown here, the beamforming may be done solely in the digital domain or solely in the analog domain.

In various embodiments, control circuitry, which may reside in a baseband processor, may provide BF weights to the analog/digital BF components to provide a transmit beam at respective antenna panels. These BF weights may be determined by the control circuitry to provide the directional provisioning of the serving cells as described herein. In some embodiments, the BF components and antenna panels may operate together to provide a dynamic phased-array that is capable of directing the beams in the desired direction.

FIG. 15 illustrates an example UE 1500 in accordance with some embodiments. The UE 1500 may be any mobile or non-mobile computing device, such as, for example, mobile phones, computers, tablets, industrial wireless sensors (for example, microphones, carbon dioxide sensors, pressure sensors, humidity sensors, thermometers, motion sensors, accelerometers, laser scanners, fluid level sensors, inventory sensors, electric voltage/current meters, actuators, etc.), video surveillance/monitoring devices (for example, cameras, video cameras, etc.), wearable devices (for example, a smart watch), relaxed-IoT devices. In some embodiments, the UE 1500 may be a RedCap UE or NR-Light UE.

The UE 1500 may include processors 1504, RF interface circuitry 1508, memory!storage 1512, user interface 1516, sensors 1520, driver circuitry 1522, power management integrated circuit (PMIC) 1524, antenna stucture 1526, and battery 1528. The components of the UE 1500 may be implemented as integrated circuits (ICs), portions thereof, discrete electronic devices, or other modules, logic, hardware, software, firmware, or a combination thereof. The block diagram of FIG. 15 is intended to show a high-level view of some of the components of the UE 1500. However, some of the components shown may be omitted, additional components may be present, and different arrangement of the components shown may occur in other implementations.

The components of the UE 1500 may be coupled with various other components over one or more interconnects 1532, which may represent any type of interface, input/output, bus (local, system, or expansion), transmission line, trace, optical connection, etc. that allows various circuit components (on common or different chips or chipsets) to interact with one another.

The processors 1504 may include processor circuitry such as, for example, baseband processor circuitry (BB) 1504A, central processor unit circuitry (CPU) 1504B, and graphics processor unit circuitry (GPU) 1504C. The processors 1504 may include any type of circuitry or processor circuitry that executes or otherwise operates computer-executable instructions, such as program code, software modules, or functional processes from memory/storage 1512 to cause the UE 1500 to perform operations as described herein.

In some embodiments, the baseband processor circuitry 1504A may access a communication protocol stack 1536 in the memory/storage 1512 to communicate over a 3GPP compatible network. In general, the baseband processor circuitry 1504A may access the communication protocol stack to: perform user plane functions at a PHY layer, MAC layer, RLC layer, PDCP layer, SDAP layer, and PDU layer; and perform control plane functions at a PHY layer, MAC layer, RLC layer, PDCP layer, RRC layer, and a non-access stratum layer. In some embodiments, the PHY layer operations may additionally/alternatively be performed by the components of the RF interface circuitry 1508.

The baseband processor circuitry 1504A may generate or process baseband signals or waveforms that carry information in 3GPP-compatible networks. In some embodiments, the waveforms for NR may be based cyclic prefix OFDM (CP-OFDM) in the uplink or downlink, and discrete Fourier transform spread OFDM (DFT-S-OFDIM) in the uplink.

The memory/storage 1512 may include one or more non-transitory, computer-readable media that includes instructions (for example, communication protocol stack 1536) that may be executed by one or more of the processors 1504 to cause the UE 1500 to perform various operations described herein. The memory/storage 1512 include any type of volatile or non-volatile memory that may be distributed throughout the UE 1500. In some embodiments, some of the memory/storage 1512 may be located on the processors 1504 themselves (for example, L1 and L2 cache), while other memory/storage 1512 is external to the processors 1504 but accessible thereto via a memory interface. The memory/storage 1512 may include any suitable volatile or non-volatile memory such as, but not limited to, dynamic random access memory (DRAM), static random access memory (SRAM), erasable programmable read only memory (EPROM), electrically erasable programmable read only memory (EEPROM). Flash memory, solid-state memory, or any other type of memory device technology.

The RF interface circuitry 1508 may include transceiver circuitry and radio frequency front module (RFEM) that allows the UE 1500 to communicate with other devices over a radio access network. The RF interface circuitry 1508 may include various elements arranged in transmit or receive paths. These elements may include, for example, switches, mixers, amplifiers, filters, synthesizer circuitry, control circuitry, etc.

In the receive path, the RFEM may receive a radiated signal from an air interface via antenna structure 1526 and proceed to filter and amplify (with a low-noise amplifier) the signal. The signal may be provided to a receiver of the transceiver that down-converts the RF signal into a baseband signal that is provided to the baseband processor of the processors 1504.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 1526.

In various embodiments, the RF interface circuitry 1508 may be configured to transmit/receive signals in a manner compatible with NR access technologies.

The antenna 1526 may include antenna elements to convert electrical signals into radio waves to travel through the air and to convert received radio waves into electrical signals. The antenna elements may be arranged into one or more antenna panels. The antenna 1526 may have antenna panels that are omnidirectional, directional, or a combination thereof to enable beamforming and multiple input, multiple output communications. The antenna 1526 may include microstrip antennas, printed antennas fabricated on the surface of one or more printed circuit boards, patch antennas, phased array antennas, etc. The antenna 1526 may have one or more panels designed for specific frequency bands including bands in FR1 or FR2.

In some embodiments, the UE 1500 may include the beamforming circuitry 1400 (FIG. 14), where the beamforming circuitry 1400 may be utilized for communication with the UE 1500. In some embodiments, components of the UE 1500 and the beamforming circuitry may be shared. For example, the antennas 1526 of the UE may include the panel 1 1404 and the panel 2 1408 of the beamforming circuitry 1400.

The user interface circuitry 1516 includes various input/output (I/O) devices designed to enable user interaction with the UE 1500. The user interface 1516 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators such as light emitting diodes "LEDs" and multi-character visual outputs, or more complex outputs such as display devices or touchscreens (for example, liquid crystal displays (LCDs), LED displays, quantum dot displays, projectors, etc.), with the output of characters, graphics, multimedia objects, and the like being generated or produced from the operation of the UE 1500.

The sensors 1520 may include devices, modules, or subsystems whose purpose is to detect events or changes in its environment and send the information (sensor data) about the detected events to some other device, module, subsystem, etc. Examples of such sensors include, inter alia, inertia measurement units comprising accelerometers, gyroscopes, or magnetometers; microelectromechanical systems or nanoelectromechanical systems comprising 3-axis accelerometers, 3-axis gyroscopes, or magnetometers; level sensors; flow sensors; temperature sensors (for example, thermistors); pressure sensors; barometric pressure sensors; gravimeters; altimeters; image capture devices (for example, cameras or lensless apertures); light detection and ranging sensors; proximity sensors (for example, infrared radiation detector and the like); depth sensors; ambient light sensors; ultrasonic transceivers; microphones or other like audio capture devices, etc.

The driver circuitry 1522 may include software and hardware elements that operate to control particular devices that are embedded in the UE 1500, attached to the UE 1500, or otherwise communicatively coupled with the UE 1500. The driver circuitry 1522 may include individual drivers allowing other components to interact with or control various input/output (110) devices that may be present within, or connected to, the UE 1500. For example, driver circuitry 1522 may include a display driver to control and allow access to a display device, a touchscreen driver to control and allow access to a touchscreen interface, sensor drivers to obtain sensor readings of sensor circuitry 1520 and control and allow access to sensor circuitry 1520, drivers to obtain actuator positions of electro-mechanic components or control and allow access to the electro-mechanic components, a camera driver to control and allow access to an embedded image capture device, audio drivers to control and allow access to one or more audio devices.

The PMIC 1524 may manage power provided to various components of the UE 1500. In particular, with respect to the processors 1504, the PMIC 1524 may control power-source selection, voltage scaling, battery charging, or DC-to-DC conversion.

In some embodiments, the PMIC 1524 may control, or otherwise be part of, various power saving mechanisms of the UE 1500. For example, if the platform UE is in an RRC_Connected state, where it is still connected to the RAN node as it expects to receive traffic shortly, then it may enter a state known as Discontinuous Reception Mode (DRX) after a period of inactivity. During this state, the UE 1500 may power down for brief intervals of time and thus save power. If there is no data traffic activity for an extended period of time, then the UE 1500 may transition off to an RRC_Idle state, where it disconnects from the network and does not perform operations such as channel quality feedback, handover, etc. The UE 1500 goes into a very low power state and it performs paging where again it periodically wakes up to listen to the network and then powers down again. The UE 1500 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 1528 may power the UE 1500, although in some examples the UE 1500 may be mounted deployed in a fixed location, and may have a power supply coupled to an electrical grid. The battery 1528 may be a lithium ion battery, a metal-air battery, such as a zinc-air battery, an aluminum-air battery, a lithium-air battery, and the like. In some implementations, such as in vehicle-based applications, the battery 1528 may be a typical lead-acid automotive battery.

FIG. 16 illustrates an example gNB 1600 in accordance with some embodiments. The gNB 1600 may include processors 1604, RF interface circuitry 1608, core network (CN) interface circuitry 1612, memory/storage circuitry 1616, and antenna structure 1626.

The components of the gNB 1600 may be coupled with various other components over one or more interconnects 1628.

The processors 1604, RF interface circuitry 1608, memory/storage circuitry 1616 (including communication protocol stack 1610), antenna structure 1626, and interconnects 1628 may be similar to like-named elements shown and described with respect to FIG. 15.

The CN interface circuitry 1612 may provide connectivity to a core network, for example, a 5th Generation Core network (5GC) using a 5GC-compatible network interface protocol such as carrier Ethernet protocols, or some other suitable protocol. Network connectivity may be provided to/from the gNB 1600 via a fiber optic or wireless backhaul. The CN interface circuitry 1612 may include one or more dedicated processors or FPGAs to communicate using one or more of the aforementioned protocols. In some implementations, the CN interface circuitry 1612 may include multiple controllers to provide connectivity to other networks using the same or different protocols.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more embodiments, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Examples

In the following sections, further exemplary embodiments are provided.

Example 1 may include one or more computer-readable media having instructions that, when executed by one or more processors, cause a next generation NodeB (gNB) to determine a number of slots in which to repeat a system information block type 1 (SIB1) transmission to be coherently combined, transmit, to a user equipment (UE), an indication of the number of slots in which the SIB1 transmission is to be repeated and coherently combined, and transmit, to the UE, the SIB1 transmission in each of one or more slots equal to the number of slots.

Example 2 may include the one or more computer-readable media of example 1, wherein to transmit the indication of the number of slots includes to transmit two bits in a physical downlink control channel (PDCCH) transmission that indicates the number of slots.

Example 3 may include the one or more computer-readable media of example 2, wherein the PDCCH transmission is in downlink control information (DCI) format 1-0.

Example 4 may include the one or more computer-readable media of any of examples 1-3, wherein the one or more slots are treated as a SIB1 group, and wherein uplink (L) transmissions are not allowed during the transmission of the SIB1 group.

Example 5 may include the one or more computer-readable media of any of examples 1-3, wherein the one or more slots comprise a plurality of slots, and wherein the instructions, when executed by the one or more processors further cause the gNB to transmit a physical downlink control channel (PDCCH) based on a control resource set (CORESET) 0 in a first portion of the plurality of slots, the PDCCH to schedule the SIB1 in the number of slots.

Example 6 may include the one or more computer-readable media of any of examples 1-3, wherein the instructions, when executed by the one or more processors further cause the gNB to derive control resource set (CORESET) 0 transmission slots with a number of slots per synchronization signal/physical broadcast channel block (SSB) being greater than 2, and transmit, to the UE, an indication of the derived CORESET 0 transmission slots.

Example 7 may include the one or more computer-readable media of example 6, wherein to derive the CORESET 0 transmission slots includes to calculate an index of slot no via the equation $n_0=(O \cdot 2^\mu + \lfloor i \cdot M \rfloor) \bmod N_{slot}^{frame,\mu}$, where O indicates which frames are going to be used within a subframe to distributing time domain. $\mu \in \{0,1\}$ based on a subcarrier spacing (SCS) for physical downlink receptions in a CORESET, i is a candidate SSB index, M is the number of slots per SSB and is greater than 2, and $N_{slot}^{frame,\mu}$ is a number of slots per frame for $\mu$.

Example 8 may include the one or more computer-readable media of any of examples 1-3, wherein the SIB1 transmission in each of the one or more slots is to be at a frequency of greater than 52.6 gigahedtz (GHz).

Example 9 may include the one or more computer-readable media of any of examples 1-3, wherein to transmit the SIB1 transmission in each of the one or more slots includes to perform listen before talk (LBT) operations for each of the one or more slots, and transmit the SIB1 transmission in each of the one or more slots based on the LBT operations being successful.

Example 10 may include one or more computer-readable media having instructions that, when executed by one or more processors, cause a user equipment (UE) to identify an indication of a number of slots in which a system information block type 1 (SIB1) is to be repeated, identify received slots including the SIB1 based on the indication of the number of slots, and coherently combine one or more of the received slots to determine information included in the SIB1.

Example 11 may include the one or more computer-readable media of example 10, wherein to identify the indication of the number of slots includes to identify bits within a physical downlink control channel (PDCCH) transmission that indicates the number of slots.

Example 12 may include the one or more computer-readable media of example 11, wherein the bits within the PDCCH transmission comprise two bits within the PDCCH transmission.

Example 13 may include the one or more computer-readable media of any of examples 10-12, wherein to coherently combine the one or more of the received slots to determine the information includes to combine an amount of the one or more of the received slots needed to adequately determine the information included in the SIB1.

Example 14 may include the one or more computer-readable media of any of examples 10-12, wherein the received slots are treated as a SIB1 group with no UL transmissions allowed between the received slots.

Example 15 may include the one or more computer-readable media of any of examples 10-12, wherein the instructions, when executed by the one or more processors, further cause the UE to identify an indication of control resource set (CORESET) 0 transmission slots, the CORESET 0 transmission slots having a number of slots per synchronization signal/physical broadcast channel block (SSB) greater than 2.

Example 16 may include the one or more computer-readable media of any of examples 10-12, wherein the received slots are within frequency range 3 (FR3).

Example 17 may include a next generation NodeB (gNB) comprising a memory to store indications of control resource set (CORESET) 0 transmission slots, and one or more processors coupled to the memory to derive CORESET 0 transmission slots for system information block type 1 (SIB1) transmissions with a number of slots per synchronization signal/physical broadcast channel block (SSB) being greater than 2 to be stored as an indication of the CORESET transmission slots 0 in the memory, and transmit, to a UE, the indication of the CORESET 0 transmission slots via a physical downlink control channel (PDCCH) transmission.

Example 18 may include the gNB of example 17, wherein to derive the CORESET 0 transmission slots includes to calculate an index of slot $n_e$ via the equation $n_0=(O \cdot 2^\mu + \lfloor i \cdot M \rfloor) \bmod N_{slot}^{frame,\mu}$, where O indicates which frames are going to be used within a subframe to distributing time domain, $\mu \in \{0,1\}$ based on a subcanier spacing (SCS) for physical downlink receptions in a CORESET, i is a candidate SSB index, M is the number of slots per SSB and is greater than 2, and $N_{slot}^{frame,\mu}$ is a number of slots per frame for $\mu$.

Example 19 may include the gNB of example 17 or example 18, wherein the derived CORESET 0 transmission slots for SIB1 transmissions are to be utilized for frequencies greater than 52.6 gigahertz (GHz).

Example 20 may include the gNB of example 17 or example 18, wherein the one or more processors are further to determine a number of slots in which to repeat a SIB1 transmission within the CORESET 0 transmission slots, and transmit, to the UE, an indication of the number of slots in which the SIB1 transmission is to be repeated and coherently combined.

Example 21 may include the gNB of example 20, wherein to transmit the indication of the number of slots includes to transmit two bits in a physical downlink control channel (PDCCH) transmission of downlink control information (DCI) format 1-0 that indicates the number of slots.

Example 22 may include the gNB of example 17 or example 18, wherein the one or more processors are further to determine a plurality of slots in which to repeat a SIB1 transmission within the CORESET 0 transmission slots, perform listen before talk (LBT) operations for the plurality of slots, and transmit the SIB1 transmission in a portion of the plurality of slots where the LBT operations are successful.

Example 23 may include an apparatus comprising means to perform one or more elements of a method described in or related to any of examples 1-22, or any other method or process described herein.

Example 24 may include one or more non-transitory computer-readable media comprising instructions to cause an electronic device, upon execution of the instructions by one or more processors of the electronic device, to perform one or more elements of a method described in or related to any of examples 1-22, or any other method or process described herein.

Example 25 may include an apparatus comprising logic, modules, or circuitry to perform one or more elements of a method described in or related to any of examples 1-22, or any other method or process described herein.

Example 26 may include a method, technique, or process as described in or related to any of examples 1-22, or portions or parts thereof.

Example 27 may include an apparatus comprising: one or more processors and one or more computer-readable media comprising instructions that, when executed by the one or more processors, cause the one or more processors to perform the method, techniques, or process as described in or related to any of examples 1-22, or portions thereof.

Example 28 may include a signal as described in or related to any of examples 1-22, or portions or parts thereof.

Example 29 may include a datagram, information element, packet, frame, segment, PDU, or message as described in or related to any of examples 1-22, or portions or parts thereof, or otherwise described in the present disclosure.

Example 30 may include a signal encoded with data as described in or related to any of examples 1-22, or portions or parts thereof, or otherwise described in the present disclosure.

Example 31 may include a signal encoded with a datagram, IE, packet, frame, segment, PDU, or message as described in or related to any of examples 1-22, or portions or parts thereof, or otherwise described in the present disclosure.

Example 32 may include an electromagnetic signal carrying computer-readable instructions, wherein execution of the computer-readable instructions by one or more processors is to cause the one or more processors to perform the method, techniques, or process as described in or related to any of examples 1-22, or portions thereof.

Example 33 may include a computer program comprising instructions, wherein execution of the program by a processing element is to cause the processing element to carry out the method, techniques, or process as described in or related to any of examples 1-22, or portions thereof.

Example 34 may include a signal in a wireless network as shown and described herein.

Example 35 may include a method of communicating in a wireless network as shown and described herein.

Example 36 may include a system for providing wireless communication as shown and described herein.

Example 37 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. One or more non-transitory computer-readable media having instructions that, when executed, cause processing circuitry to:
   determine a number of slots in which to repeat a system information block type 1 (SIB1) transmission to be coherently combined;
   generate, for transmission to a user equipment (UE), an indication of the number of slots in which the SIB1 transmission is to be repeated and coherently combined;
   generate a physical downlink control channel (PDCCH) for transmission based on a control resource set (CORESET) 0 in a first portion of a plurality of slots, the PDCCH to schedule the SIB1 transmission in the number of slots; and
   generate, for transmission to the UE, the SIB1 transmission in each of the plurality of slots equal to the number of slots.

2. The one or more non-transitory computer-readable media of claim 1, wherein to generate the indication of the number of slots includes to generate two bits in a PDCCH transmission that indicates the number of slots.

3. The one or more non-transitory computer-readable media of claim 2, wherein the PDCCH transmission is in downlink control information (DCI) format 1-0.

4. The one or more non-transitory computer-readable media of claim 1, wherein the plurality of slots are treated as a SIB1 group, and wherein uplink (UL) transmissions are not allowed during the transmission of the SIB1 group.

5. The one or more non-transitory computer-readable media of claim 1, wherein the instructions, further cause the processing circuitry to:
   derive CORESET 0 transmission slots with a number of slots per synchronization signal/physical broadcast channel block (SSB) being greater than 2; and
   generate, for transmission to the UE, an indication of the derived CORESET 0 transmission slots.

6. The one or more non-transitory computer-readable media of claim 5, wherein to derive the CORESET 0 transmission slots includes to calculate an index of slot $n_0$ via the equation $n_0 = (O \cdot 2^\mu + \lfloor i \cdot M \rfloor) \bmod N_{slot}^{frame,\mu}$, where O indicates which frames are going to be used within a subframe to distributing time domain, $\mu \in \{0,1\}$ based on a subcarrier spacing (SCS) for physical downlink receptions in a CORESET, I is a candidate SSB index, M is the number of slots per SSB and is greater than 2, and $N_{slot}^{frame,\mu}$ is a number of slots per frame for u.

7. The one or more non-transitory computer-readable media of claim 1, wherein the SIB1 transmission in each of the plurality of slots is to be at a frequency of greater than 52.6 gigahertz (GHz).

8. The one or more non-transitory computer-readable media of claim 1, wherein to generate the SIB1 transmission in each of the plurality of slots includes to:
   perform listen before talk (LBT) operations for each of the plurality of slots; and
   generate the SIB1 transmission for transmission in each of the plurality of slots based on the LBT operations being successful.

9. One or more non-transitory computer-readable media having instructions that, when executed, cause processing circuitry to:
   identify two bits within a physical downlink control channel (PDCCH) transmission that indicates a number of slots in which a system information block type 1 (SIB1) is to be repeated;
   identify received slots including the SIB 1 based on the two bits; and
   coherently combine one or more of the received slots to determine information included in the SIB1.

10. The one or more non-transitory computer-readable media of claim 9, wherein to coherently combine the one or more of the received slots to determine the information includes to combine an amount of the one or more of the received slots needed to adequately determine the information included in the SIB1.

11. The one or more non-transitory computer-readable media of claim 9, wherein the received slots are treated as a SIB1 group with no uplink (UL) transmissions allowed between the received slots.

12. The one or more non-transitory computer-readable media of claim 9, wherein the instructions, when executed, further cause the processing circuitry to identify an indication of control resource set (CORESET) 0 transmission slots, the CORESET 0 transmission slots having a number of slots per synchronization signal/physical broadcast channel block (SSB) greater than 2.

13. The one or more non-transitory computer-readable media of claim 9, wherein the received slots are within frequency range 3 (FR3).

14. An apparatus comprising:
processing circuitry to:
derive control resource set (CORESET) 0 transmission slots for system information block type 1 (SIB1) transmissions with a number of slots per synchronization signal/physical broadcast channel block (SSB) being greater than 2 to be stored as an indication of the CORESET transmission slots 0, wherein to derive the CORESET 0 transmission slots includes to calculate an index of slot $n_0$ via the equation $n_0 = (O \cdot 2^\mu + \lfloor i \cdot M \rfloor) \bmod N_{slot}^{frame,\mu}$, where O indicates which frames are going to be used within a subframe to distributing time domain, $\mu \in \{0,1\}$ based on a subcarrier spacing (SCS) for physical downlink receptions in a CORESET, I is a candidate SSB index, M is the number of slots per SSB and is greater than 2, and $N_{slot}^{frame,\mu}$ is a number slot of slots per frame for $\mu$; and
generate, for transmission to a user equipment (UE), the indication of the CORESET 0 transmission slots via a physical downlink control channel (PDCCH) transmission; and
interface circuitry coupled with the processing circuitry, the interface circuitry to communicatively couple the processing circuitry with a component of a device.

15. The apparatus of claim 14, wherein the derived CORESET 0 transmission slots for SIB1 transmissions are to be utilized for frequencies greater than 52.6 gigahertz (GHz).

16. The apparatus of claim 14, wherein the processing circuitry is further to:
determine a number of slots in which to repeat a SIB1 transmission within the CORESET 0 transmission slots; and
generate, for transmission to the UE, an indication of the number of slots in which the SIB1 transmission is to be repeated and coherently combined.

* * * * *